United States Patent
Lin et al.

(10) Patent No.: US 12,414,119 B2
(45) Date of Patent: Sep. 9, 2025

(54) METHOD RELATED TO PHYSICAL UPLINK CONTROL CHANNEL CELL SWITCHING AND USER EQUIPMENT

(71) Applicant: SHARP KABUSHIKI KAISHA, Sakai (JP)

(72) Inventors: Wan-Chen Lin, Taipei (TW); Heng-Li Chin, Taipei (TW); Hai-Han Wang, Taipei (TW); Hung-Chen Chen, Taipei (TW); Chia-Hung Wei, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 464 days.

(21) Appl. No.: 17/880,684

(22) Filed: Aug. 4, 2022

(65) Prior Publication Data

US 2023/0051867 A1    Feb. 16, 2023

Related U.S. Application Data

(60) Provisional application No. 63/260,058, filed on Aug. 6, 2021.

(51) Int. Cl.
*H04W 72/21*    (2023.01)

(52) U.S. Cl.
CPC ................................. *H04W 72/21* (2023.01)

(58) Field of Classification Search
CPC ..... H04L 5/001; H04L 5/0053; H04L 5/0098; H04L 5/0007; H04W 72/21; H04W 12/03; H04W 72/1273
See application file for complete search history.

(56) References Cited

U.S. PATENT DOCUMENTS

| 2016/0323873 | A1  | 11/2016 | Takeda et al. |
| 2018/0092156 | A1* | 3/2018  | Kim ..................... H04W 12/03 |
| 2022/0053522 | A1* | 2/2022  | MolavianJazi ... H04L 27/26025 |

FOREIGN PATENT DOCUMENTS

| CN | 105992285  | 10/2016 |
| CN | 1111800869 | 10/2020 |

OTHER PUBLICATIONS

"5G; NR; Physical layer procedures for control," 3GPP TS 38.213 version 16.10.0 Release 16, Jul. 2022, pp. 1-193.
"5G; NR; Radio Resource Control (RRC); Protocol specification," 3GPP TS 38.331 version 16.8.0 Release 16, May 2022, pp. 1-946.
(Continued)

*Primary Examiner* — Anez C Ebrahim
(74) *Attorney, Agent, or Firm* — ScienBiziP, P.C.

(57) ABSTRACT

A method related to physical uplink control channel (PUCCH) cell switching and a user equipment (UE) are provided. The method includes: receiving a radio resource control (RRC) message from a base station; determining a PUCCH cell from the first cell and the second cell according to at least one PUCCH cell pattern; and transmitting the PUCCH transmission on the PUCCH cell during the time resource units. The RRC message includes at least one PUCCH cell pattern associated with multiple cell indexes and a first subcarrier spacing (SCS) associated with a first cell and a second SCS associated with a second cell. Each cell index corresponds to a cell, and the PUCCH cell pattern indicates which cell corresponds to one time resource unit used for PUCCH transmission.

20 Claims, 10 Drawing Sheets

(56) References Cited

OTHER PUBLICATIONS

Nokia et al., "HARQ-ACK Feedback Enhancements for URLLC/IIoT", 3GPP TSG RAN WG1 #105-e, e-Meeting, R1-2104309, May 19-27, 2021, pp. 1-11.
"International Search Report (Form PCT/ISA/210) of PCT/CN2022/110106," mailed on Oct. 25, 2022, pp. 1-4.
Moderator (Nokia): "Final moderator summary on HARQ-ACK feedback enhancements for NR Rel-17 URLLC/IIoT", R1-2106249, 3GPP TSG-RAN WG1 Meeting #105-e, e-Meeting, May 19-27, 2021.
Panasonic: "Discussion on UE feedback enhancements for HARQ-Ack", R1- 2105188, 3GPP TSG RAN WG1 #105-e, e-Meeting, May 10-27, 2021.

* cited by examiner

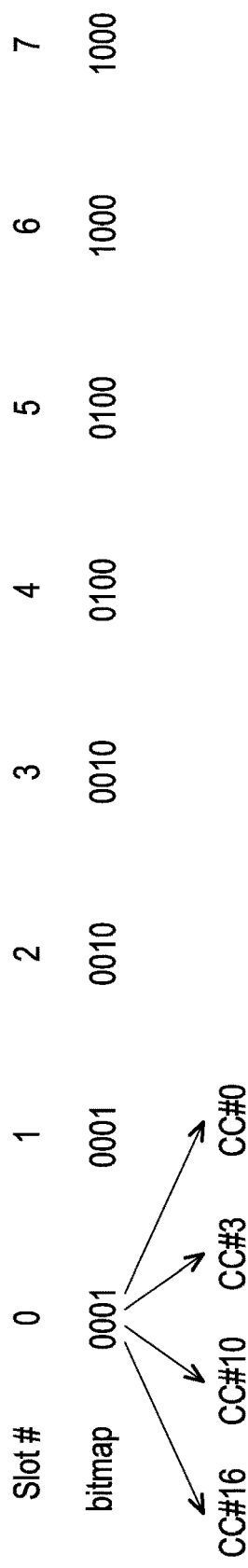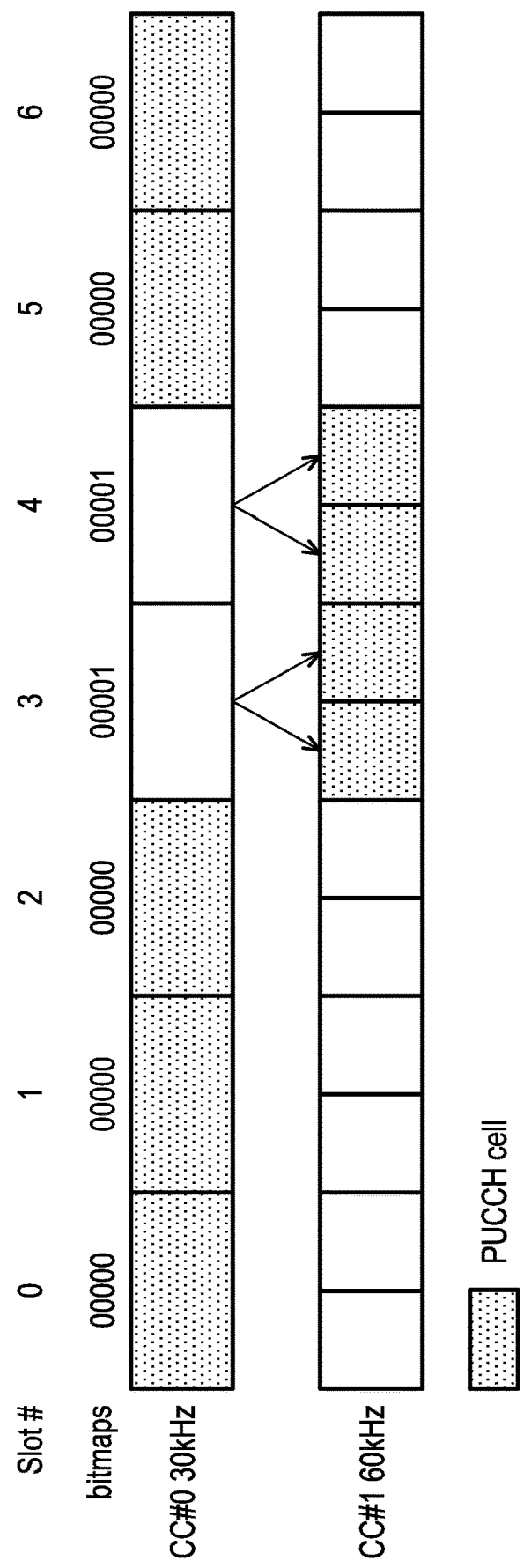
FIG. 4
FIG. 5

METHOD RELATED TO PHYSICAL UPLINK CONTROL CHANNEL CELL SWITCHING AND USER EQUIPMENT

CROSS-REFERENCE TO RELATED APPLICATION(S)

The present application claims the benefit of and priority to U.S. Provisional Patent Application Ser. No. 63/260,058, filed on Aug. 6, 2021, entitled "METHOD AND APPARATUS TO HANDLE PUCCH CARRIER SWITCHING", the content of which is hereby incorporated fully by reference herein into the present disclosure.

FIELD

The present disclosure generally relates to wireless communications, and more particularly, to a method related to physical uplink control channel (PUCCH) cell switching and a user equipment.

BACKGROUND

With the tremendous growth in the number of connected devices and the rapid increase in user/network traffic volume, various efforts have been made to improve different aspects of wireless communication for the next-generation wireless communication system, such as the fifth generation (5G) New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC).

In 3GPP NR Rel-15 and Rel-16 specifications, the NW may configure one or more PUCCH cells where PUCCH is transmitted. However, the current PUCCH configuration may not meet the low latency requirement of URLLC. Considering PUCCH configurations for multiple PUCCH cells with different subcarrier spacings or cyclic prefixes, a UE may confuse which time resource unit would be used by a target PUCCH cell for the PUCCH transmission after the cell switching. Furthermore, considering dynamic carrier switching and semi-static carrier switching both are applied, multiple target PUCCH cells may be indicated, so that the detailed mechanism needs to be specified.

SUMMARY

The present disclosure is directed to a method related to physical uplink control channel (PUCCH) cell switching and a user equipment (UE).

According to one or more exemplary embodiments of the disclosure, a method related to PUCCH used for a UE is provided. The method includes, but is not limited to, the following steps: receiving a radio resource control (RRC) message from a base station; determining a PUCCH cell from a first cell and a second cell according to one or more PUCCH cell patterns; and transmitting the PUCCH transmission on the PUCCH cell during the time resource units. The RRC message includes one or more PUCCH cell patterns associated with multiple cell indexes and a first subcarrier spacing (SCS) associated with the first cell and a second SCS associated with the second cell. Each cell index corresponds to a cell, and the PUCCH cell pattern indicates which cell corresponds to one of time resource units used for PUCCH transmission.

According to one or more exemplary embodiments of the disclosure, a UE is provided. The UE includes, but is not limited to, a transceiver, one or more memories, and one or more processors. The memory has computer-executable instructions embodied thereon. The processor is coupled to the transceiver and the memory. The processor is configured to execute the computer-executable instructions to perform the following steps: receiving a RRC message from a base station; determining a PUCCH cell from a first cell and a second cell according to one or more PUCCH cell patterns; and transmitting the PUCCH transmission on the PUCCH cell during the time resource units. The RRC message includes one or more PUCCH cell patterns associated with multiple cell indexes and a first SCS associated with the first cell and a second SCS associated with the second cell. Each cell index corresponds to a cell, and the PUCCH cell pattern indicates which cell corresponds to one of time resource units used for PUCCH transmission.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

FIG. 4 is a schematic diagram that illustrates an example of illustrating bitmaps for indicating PUCCH cell in ascending order according to one of the exemplary embodiments of the disclosure.

FIG. 5 is a schematic diagram that illustrates PUCCH cell (timing) pattern applied to cells with different SCS according to one of the exemplary embodiments of the disclosure.

DETAILED DESCRIPTION

Figure 1:
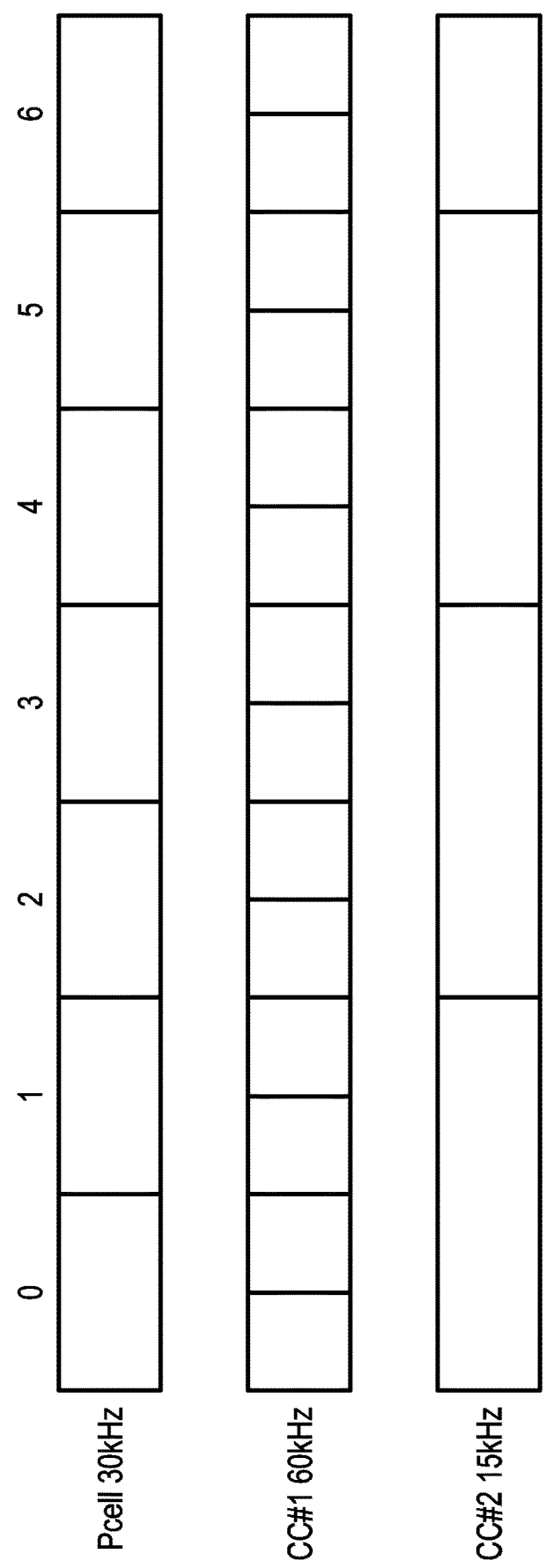
FIG. 1 and FIG. 2 are schematic diagrams that illustrate examples of PUCCH cell (timing) patterns with different numerologies.

The acronyms in the present disclosure are defined as follows and unless otherwise specified, the acronyms have the following meanings:

| Acronym | Full name |
| --- | --- |
| 3GPP | 3rd Generation Partnership Project |
| 5G | 5th generation |
| ACK | Acknowledgment |
| BWP | Band Width Part |
| CC | Component Carrier |
| CE | Control Element |
| C-RNTI | Cell Radio Network Temporary Identifier |
| CSI | Channel State Information |
| CS-RNTI | Configured Scheduling Radio Network Temporary Identifier |
| DAI | Downlink Assignment Index |
| DC | Dual Connectivity |
| DCI | Downlink Control Information |
| DL | Downlink |
| FR1 | Frequency Range 1 |
| FR2 | Frequency Range 2 |
| GC-PDCCH | Group Common Physical Downlink Control Channel |
| HARQ | Hybrid Automatic Repeat Request |
| IE | Information Element |
| IIoT | Industrial Internet of Things |
| LRR | Link Recovery Request |
| LSB | Least Significant Bit |
| LTE | Long Term Evolution |
| L1 | Layer 1 |
| MAC | Medium Access Control |
| MCG | Master Cell Group |
| MCS-C-RNTI | Modulation Coding Scheme Cell Radio Network Temporary Identifier |
| MIMO | Multi-input Multi-output |
| MSB | Most Significant Bit |
| NACK | Negative Acknowledgment |
| NDI | New Data Indicator |
| NR | New RAT/Radio |
| NW | Network |
| PCell | Primary Cell |
| PSCell | Primary Secondary Cell |
| PBCH | Physical Broadcast Channel |
| PDCCH | Physical Downlink Control Channel |
| PDSCH | Physical Downlink Shared Channel |
| PDU | Protocol Data Unit |
| PHY | Physical |
| PRI | PUCCH Resource Indicator |
| PTAG | Primary Timing Advance Group |
| PUCCH | Physical Uplink Control Channel |
| PUCCH-SCell | PUCCH SCell |
| PUSCH | Physical Uplink Shared Channel |
| RAN | Radio Access Network |
| Rel | Release |
| RMSI | Remaining Minimum System Information |
| RNTI | Radio Network Temporary Identifier |
| RRC | Radio Resource Control |
| RV | Redundancy Version |
| SCell | Secondary Cell |
| SCG | Secondary Cell Group |
| SCS | Subcarrier Spacing |
| SFI | Slot Format Indicator |
| SpCell | Special Cell |
| SLIV | Start and Length Indicator Value |
| SPS | Semi-Persistent Scheduling |
| SR | Scheduling Request |
| SRS | Sounding Reference Signal |
| SSB | Synchronization Signal Block |
| STAG | Secondary Timing Advance Group |
| TAG | Timing Advance Group |
| TB | Transport Block |
| TBS | Transport Block Size |
| TCI | Transmission Configuration Indicator |
| TDD | Time Division Duplex |
| TR | Technical Report |
| TS | Technical Specification |
| TX | Transmission |
| UCI | Uplink Control Information |
| UE | User Equipment |
| UL | Uplink |
| UL-SCH | Uplink Shared CHannel |
| URLLC | Ultra Reliable Low Latency Communication |
| USS | UE-Specific Search Space |
| WG | Working Group |
| WI | Working Item |
| QCL | Quasi Co-Location |

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to", which specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Any sentence, paragraph, (sub)-bullet, point, action, behavior, term, alternative, aspect, example, or claim described in the present disclosure may be combined logically, reasonably, and properly to form a specific method. Any sentence, paragraph, (sub)-bullet, point, action, behavior, term, alternative, aspect, example, or claim described in the present disclosure may be implemented independently and separately to form a specific method. Dependency, e.g., "based on", "more specifically", "in some implementations", "in one alternative", "in one example", "in one aspect", or etc., in the present disclosure is just one possible example in which would not restrict the specific method. One aspect of the present disclosure may be used, for example, in a communication, communication equipment (e.g., a mobile telephone apparatus, ad base station apparatus, a wireless LAN apparatus, and/or a sensor device, etc.), and integrated circuit (e.g., a communication chip) and/or a program, etc. According to any sentence, paragraph, (sub)-bullet, point, action, behavior, term, alternative, aspect, example, implementation, or claim described in the present disclosure, "X/Y" may include the meaning of "X or Y". According to any sentence, paragraph, (sub)-bullet, point, action, behavior, term, alternative, aspect, example, implementation, or claim described in the present disclosure, "X/Y" may also include the meaning of "X and Y". According to any sentence, paragraph, (sub)-bullet, point, action, behavior, term, alternative, aspect, example, implementation, or claim described in the present disclosure, "X/Y" may also include the meaning of "X and/or Y".

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station (or called an NW device or NW) may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present disclosure should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The base station may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate sidelink (SL) resources for supporting Proximity Service (ProSe) or Vehicle to Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, a Master Cell Group (MCG) may be formed by an MN, and a Secondary Cell Group (SCG) may be formed by an SN. In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the MAC entity is associated with the MCG or the SCG. Otherwise, the term Special Cell may refer to the PCell. A Special Cell may support a Physical Uplink Control Channel (PUCCH) transmission and contention-based Random Access (CBRA), and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

Some related technologies are introduced first.

PUCCH: In 3GPP NR Rel-15 and Rel-16 specifications, the NW configures PUCCH-Config at least on non-initial BWP for SpCell and PUCCH SCell. PUCCH SCell refers to an SCell configured with PUCCH. If supported by the UE, the NW may configure at most one additional SCell of a cell group (e.g., master cell group or secondary cell group) with PUCCH-Config. PUCCH configuration may be configured for one BWP of the normal UL or SUL of a serving cell. If the UE is configured with SUL, the NW configures PUCCH only on the BWPs of one of the uplinks (e.g., normal UL or SUL). In other words, PUCCH may be transmitted on one serving cell in a PUCCH cell group. If the UE is configured with a PUCCH-SCell, the UE may apply the corresponding PUCCH transmission for both primary PUCCH group and secondary PUCCH group. Furthermore, the NW may configure the index of the serving cell of the same cell group to use for PUCCH by a field pucch-Cell in PDSCH-Serving-CellConfig. If the field is absent, the UE sends the HARQ feedback on the PUCCH of the SpCell of this cell group, or on this serving cell if it is a PUCCH SCell. It is noted that PUCCH cell may refer to the cell where PUCCH is transmitted. It is noted that carrier may refer to cell in the following description.

PUCCH resources may include configured PUCCH resources and scheduled PUCCH resources. It is noted that the configured PUCCH resources may refer to resources without dynamic indication (e.g., PRI in a DCI), for example, PUCCH resources for LRR, SR, CSI, or/and SPS PDSCH HARQ-ACK. On the other hand, the scheduled PUCCH resources may refer to resources indicated by the DCI, for example, PUCCH resources for HARQ-ACK in response to PDSCH.

Numerologies: In 3GPP NR specification, multiple numerologies are supported as given by a table where the cyclic prefix for a downlink or uplink bandwidth part is obtained from the higher layer parameters subcarrierSpacing and cyclicPrefix, respectively.

URLLC: In 3GPP Rel-15 NR specification, the basic support for URLLC was introduced with TTI structures for low latency as well as methods for improved reliability. The enhancement includes that introducing a new RNTI (e.g., MCS-C-RNTI) to enable a more reliable coding scheme. In NR specification Rel-16, further enhancements are introduced to reduce latency and enhance reliability. For example, PDCCH enhancements introduce span pattern within a slot, and DCI formats with smaller payload size (e.g., DCI format 0-2 and DCI format 1-2). UCI enhancements enable more than one HARQ-ACK codebook within a slot, UCIs (or PUCCH) corresponding to different priorities, two PUCCH configurations, and SPS only HARQ-ACK codebook. PUSCH enhancements enable non-slot based PUSCH repetition. Inter-UE prioritization enables transmission of higher priority to be prioritized. Multiple active configured grant configurations and SPS configurations per BWP provide a lower latency and more flexible semi-persistent scheduling.

HARQ: A functionality ensures delivery between peer entities at Layer 1 (i.e., Physical Layer). A single HARQ process supports one Transport Block (TB) when the physical layer is not configured for downlink/uplink spatial multiplexing, and when the physical layer is configured for downlink/uplink spatial multiplexing, a single HARQ process supports one or multiple TBs. There is one HARQ entity per serving cell. Each of HARQ entity supports a parallel (number) of DL and UL HARQ processes.

There are some problems in the existing mechanism.

Provide PUCCH Cell (Timing) Pattern of Applicable PUCCH Cells:

Since only a few UL symbols are available to transmit the HARQ-ACK information in DL heavy TDD configuration, it is hard to meet the low latency requirement upon URLLC scenario. Although different serving cells may have different UL/DL patterns, PUCCH can only be transmitted on PCell in a PUCCH cell group including PCell or on a configured serving cell, i.e., PUCCH SCell, in a PUCCH cell group not including PCell. Thus, such configuration may lead to long latency due to a lack of available UL resource for PUCCH transmission. One of possible enhancements is switching the PUCCH carrier (e.g., carrier with PUCCH transmission) to schedule the UL resources adequately. In other words, PUCCH carrier switching enables PUCCH to be transmitted on other serving cells when there is no available resource on PCell or PUCCH SCell. The other serving cells on which PUCCH may be transmitted are referred as PUCCH cells in the following. Furthermore, PUCCH carrier switching may be dynamically indicated or semi-statically configured. Considering there is a chance that the dynamic indication for some configured PUCCH resources (e.g., PUCCH for SR, PUCCH for SPS HARQ-ACK) may not work, some rules for the configured resources may need to be applied. A PUCCH cell (timing) pattern may indicate the applicable PUCCH cells for each slot, and a detailed configuration for the (timing) pattern needs to be specified.

Figure 2:
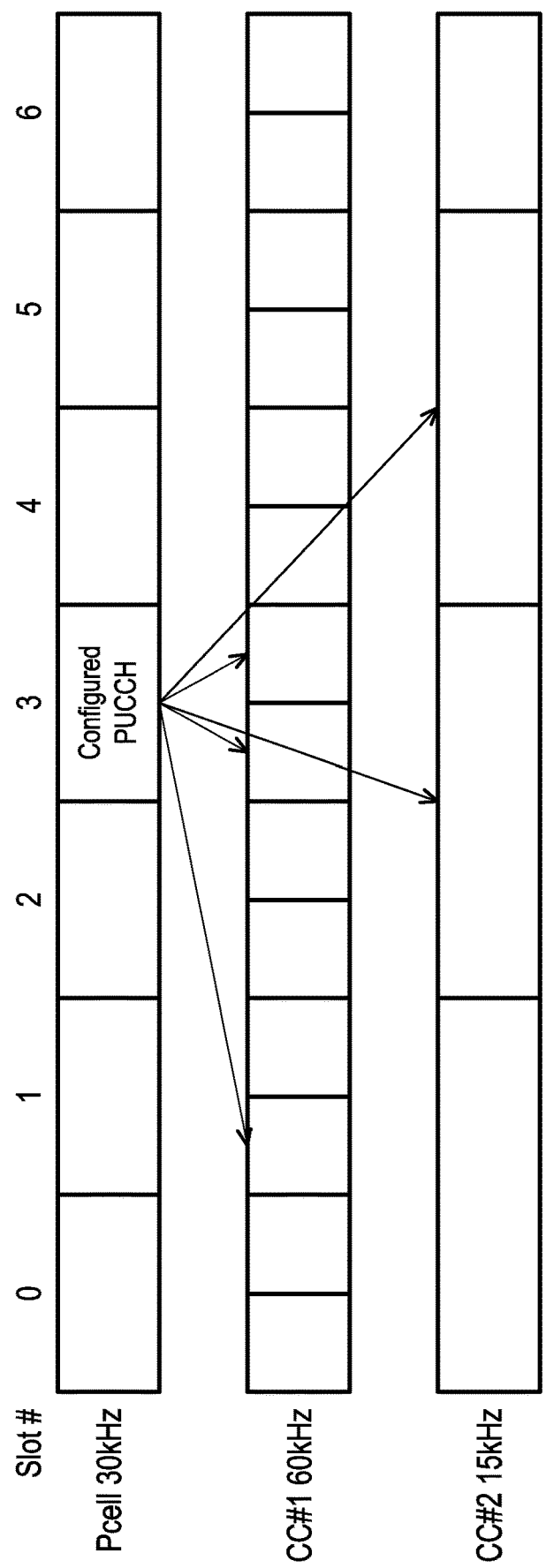

PUCCH Cell (Timing) Pattern Across Cells with Different Numerologies:

When the PUCCH cell (timing) pattern is configured and the granularity of the PUCCH carrier switching is configured for each slot/sub-slot, there is a chance that the switching pattern for a slot/sub-slot on initial PUCCH cell (e.g., PCell or PUCCH cell before switching) corresponds to more than one slot/sub-slot on target PUCCH cell (e.g., after switching). For example, FIG. 1 and FIG. 2 are schematic diagrams that illustrate examples of PUCCH cell (timing) patterns with different numerologies. As illustrated in FIG. 1 and FIG. 2, one slot of the initial PUCCH cell may correspond to more than one slot of a target PUCCH cell (such as CC #1) when a target PUCCH cell is configured with higher SCS compared to the SCS of the initial PUCCH cell. For another example, more than one slot on the initial PUCCH cell may correspond to one slot of a target PUCCH cell (such as CC #2) when the initial PUCCH cell is configured with higher SCS compared to the SCS of the target PUCCH cell. Thus, interpretation on PUCCH cell (timing) patterns with different numerologies and additional rules for indicating where the PUCCH is transmitted need to be specified. It is noted that PUCCH cell after switching may refer to a target cell (or target PUCCH cell, PUCCH SCell) and the PUCCH cell before switching may refer to initial cell (or initial PUCCH cell, Pcell). It is noted that the target PUCCH cell may refer to one or more than one serving cell with PUCCH transmission other than Pcell.

Interaction of Dynamic Carrier Switching and Semi-Static Carrier Switching:

If PUCCH cell (timing) pattern (e.g., semi-static carrier switching) is applied to configured PUCCH resources whereas dynamic indication (e.g., dynamic carrier switching) is applied to scheduled PUCCH resources, different target cells might be indicated for the configured PUCCH and the scheduled PUCCH, and hence switching procedure and detailed mechanism need to be specified (e.g., the order of carrier switching). On the contrary, if both PUCCH cell (timing) pattern and dynamic indication are applied to all the PUCCH resources, further details of interaction of PUCCH cell (timing) pattern and dynamic indication need to be specified.

To deal with the aforementioned issues/problems, the following preferred embodiments are proposed. These embodiments would be summarized at first. Then, a further detailed description thereof would be introduced.

PUCCH Cell (Timing) Pattern Configuration:

PUCCH cell (timing) pattern may include a set of bitmaps to indicate the applied PUCCH cell for PUCCH transmission for each slot/sub-slot for a UE.

In some examples, at least one PUCCH cell (timing) pattern may be configured, and each PUCCH cell (timing) pattern may correspond to a specific index.

In some examples, at least one PUCCH cell (timing) pattern may be configured, and a slot/sub-slot level bitmap may be used to indicate the target PUCCH cell. For example, a UE may be preconfigured with a bitmap by a DL RRC signalling or a DL MAC CE. Each bit or a set of bits of the bitmap may be associated with a slot/sub-slot, and the value of each bit indicates UE which PUCCH cell is applied for PUCCH transmission for each slot/sub-slot.

In some examples, a specific configuration may be used to configure a PUCCH cell pattern (e.g., PUCCH-CellPattern), which may be used to indicate the switching pattern for PUCCH cells.

In some examples, a set of PUCCH cell (timing) patterns (e.g., referring to a PUCCH cell (timing) pattern list) may be used to configure the PUCCH cell (timing) pattern for each PUCCH cell group (e.g., a primary PUCCH cell group, a secondary PUCCH cell group).

In some examples, a set of PUCCH cell patterns (e.g., referring to a PUCCH cell pattern list) may be used to configure a first pattern for PUCCH of the serving cells in the PUCCH cell group including at least PCell (e.g., the primary PUCCH cell group) and a second pattern for PUCCH of the serving cells in the PUCCH cell group including at least PUCCH SCell (i.e., the secondary PUCCH cell group).

In some examples, at least one table may be used to indicate at least one PUCCH cell (timing) pattern.

In some examples, the PUCCH cell (timing) pattern may refer to some information for PUCCH cell indication, for instance, periodicity, duration, PUCCH cell index, sub-carrier spacing of corresponding carrier, reference sub-carrier spacing, bitmaps, pattern index, granularity of the PUCCH cell (timing) pattern (e.g., sub-slot, slot, millisecond, second, subframe, or/and frame), or/and associated PDSCH serving cell.

In some examples, a set of bitmaps may be used to indicate the corresponding PUCCH cell for each slot/sub-slot, and a subset from the set of bitmaps may refer to a serving cell.

In some examples, a set of bitmaps may be used to indicate the corresponding PUCCH cell for each slot/sub-slot, and a subset from the set of bitmaps may refer to the transmission status within a period for a serving cell. More specifically, the transmission status may refer to whether the PUCCH is transmitted or not.

In some examples, a set of bitmaps may refer to the transmission status for a PUCCH cell for a slot/sub-slot.

In some examples, a set of bitmaps may refer to transmission status for a PUCCH cell or/and a set of PUCCH cells for a slot/sub-slot.

In some examples, a set of PUCCH cell (timing) patterns may be configured, and each PUCCH cell (timing) pattern may refer to at most two cells.

Handling of PUCCH Cell Pattern Across Cells with Different Numerologies:

In some examples, PUCCH PCell, PUCCH SpCell (of this cell group), or PUCCH cell with the lowest index (e.g., index 0) may always refer to the cell with the lowest SCS among cells in a PUCCH cell group.

In some examples, initial PUCCH cell or reference PUCCH cell may always refer to the cell with highest SCS or lowest SCS among cells in a PUCCH cell group. Preferably, the SCS of the reference cell may refer to the reference SCS.

In some examples, a reference cell may be configured or indicated. Preferably, the PUCCH cell (timing) pattern configured to the reference cell may apply to all other cells. Preferably, the reference cell may refer to the PUCCH of the SpCell. Preferably, the reference cell may refer to any cell in the cell group.

It is noted that the description 'PUCCH carrier moves from lower SCS to higher SCS' may refer to 'a target cell is configured with higher SCS compared to the SCS of an initial cell'.

In some examples, if (or only if) the PUCCH carrier moves from lower SCS to higher SCS, one slot in the cell with lower SCS may correspond to more than one slots in the cell with higher SCS. A set of bitmaps referring to one slot in the cell with lower SCS may apply to more than one slots in the cell with higher SCS.

In some examples, if (or only if) the PUCCH carrier moves from higher SCS to lower SCS, more than one slot in the cell with higher SCS may correspond to one slot in the cell with lower SCS. A set of bitmaps for each slot may be based on the slot index for each cell.

In some examples, a formula may be used to indicate the PUCCH cell (timing) pattern (configured for initial cell/reference cell/SpCell) is applied to which slot in target cell.

In some examples, if (or only if) the PUCCH carrier moves from higher SCS to lower SCS, more than one slot in the cell with higher SCS may correspond to one slot in the cell with lower SCS. The more than one slot may be expected to refer to the same PUCCH carrier.

In some examples, if (or only if) the PUCCH carrier moves from lower SCS to higher SCS, at least one configured/scheduled PUCCH that would be transmitted in a first slot upon the initial PUCCH carrier may be instead transmitted in the earliest slot upon the target carrier that overlaps with the first slot upon the initial PUCCH carrier.

In some examples, if (or only if) the PUCCH carrier moves from a lower SCS initial carrier to a higher SCS target carrier, the UE may not transmit at least one configured/scheduled PUCCH in a first slot upon the initial carrier. The UE may transmit the at least one configured/scheduled PUCCH in the latest slot upon the target carrier that overlaps with the first slot.

In some examples, if (or only if) the PUCCH carrier moves from a lower SCS initial carrier to a higher SCS target carrier, the UE may not transmit at least one configured/scheduled PUCCH in a first slot upon the initial carrier. The UE may transmit the at least one configured/scheduled PUCCH in the slot upon the target carrier that overlaps with the configured/scheduled PUCCH.

In some examples, if (or only if) the PUCCH carrier moves from a higher SCS initial carrier to a lower SCS target carrier, the UE may not transmit at least one configured/scheduled PUCCH in a first slot upon the initial carrier. The UE may transmit the at least one configured/scheduled PUCCH in the slot upon the target carrier that overlaps with the first slot.

In some examples, if (or only if) the PUCCH carrier moves from a higher SCS initial carrier to a lower SCS target carrier, the UE may not transmit at least one configured/scheduled PUCCH in a first slot upon the initial carrier. The UE may transmit the at least one configured/scheduled PUCCH in the next slot starting after the slot upon the target carrier that overlaps with the first slot.

In some examples, if (or only if) the PUCCH carrier moves from a higher SCS initial carrier to a lower SCS target carrier, the UE may not transmit at least one configured/scheduled PUCCH in a first slot upon the initial carrier. The UE may transmit the at least one configured/scheduled PUCCH upon the target carrier that has the same slot index as the first slot.

Joint Operation of Dynamic Carrier Switching and Semi-Static Carrier Switching:

In some examples, dynamic carrier switching (refer to DCI indication) and semi-static carrier switching (refer to PUCCH cell (timing) pattern) may apply to scheduled PUCCH and configured PUCCH, respectively.

In some examples, the indication from dynamic carrier switching may override the indication from semi-static carrier switching.

In some examples, UE may perform multiplexing and deferral for configured PUCCH before performing carrier switching.

In some examples, both configured and scheduled PUCCH may be transmitted on the cell configured by PUCCH cell (timing) pattern, and DCI may be used to further change the configured PUCCH cell.

Figure 3:
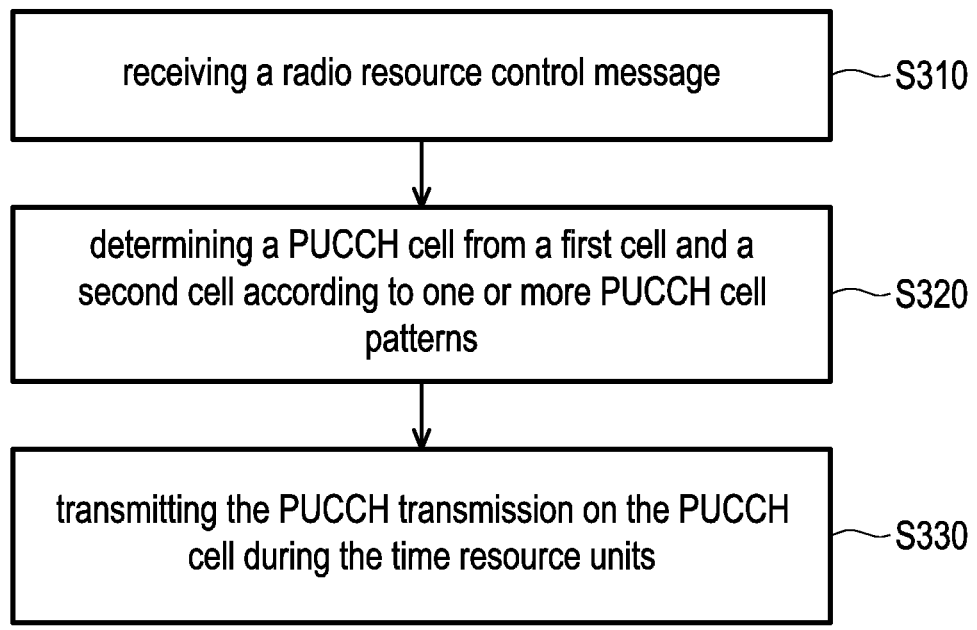
FIG. 3 is a flow chart that illustrates a method related to PUCCH cell switching according to one of the exemplary embodiments of the disclosure.

PUCCH Cell (Timing) Pattern Configuration for a Detailed Description:

FIG. 3 is a flow chart that illustrates a method related to PUCCH cell switching according to one of the exemplary embodiments of the disclosure. Referring to FIG. 3, note that the order of the steps in this Figure may be changed according to the actual requirements.

Step S310: a UE receives a RRC message from a base station. The RRC message includes one or more PUCCH cell patterns associated with multiple cell indexes and a first SCS associated with a first cell and a second SCS associated with a second cell. Each cell index corresponds to a cell, and the PUCCH cell pattern indicates which cell corresponds to one of time resource units used for PUCCH transmission.

In one embodiment, the first cell is a reference cell, and the first SCS is a reference SCS.

In one embodiment, the reference cell is a PCell or a SPcell.

In one embodiment, each of the time resource units is a slot or a sub-slot, and at least one bit of a bit set of the at least one PUCCH cell pattern corresponds to the slot/sub-slot.

Step S320: The UE determines a PUCCH cell from the first cell and the second cell according to the PUCCH cell pattern.

Step S330: The UE transmits the PUCCH transmission on the PUCCH cell during the time resource units.

In one embodiment, the PUCCH transmission may carry HARQ-ACK, SR, LRR or CSI.

In one embodiment, at least one PUCCH cell (timing) pattern may be configured, and each PUCCH cell (timing) pattern may correspond to a specific index. NW may use a specific index to modify or release an associated PUCCH cell (timing) pattern. More specifically, each PUCCH cell (timing) pattern may refer to the target PUCCH cell for a slot or refer to the target PUCCH cells for a period. Preferably, the period may be varied by different SCS configurations.

In one embodiment, at least one PUCCH cell (timing) pattern may be configured with a validity timer. The UE may start an associated validity timer once receiving a corresponding PUCCH cell (timing) pattern, the corresponding PUCCH cell (timing) pattern is activated, or the related parameter(s) is reconfigured, but not limited to. The UE may stop an associated validity timer once a corresponding PUCCH cell (timing) pattern is deactivated or a corresponding PUCCH cell is deactivated/released, but not limited to. The UE may release/suspend a PUCCH cell (timing) pattern if an associated validity timer expired. In one embodiment, a configured PUCCH cell (timing) pattern without a validity timer may be considered as valid all the time until receiving a NW command (e.g., via DCI, MAC CE, or RRC message) to release/suspend it.

In one embodiment, at least one PUCCH cell (timing) pattern may be configured with a validity counter. The UE may start increasing an associated validity counter once starting using a corresponding PUCCH cell (timing) pattern. A validity counter may increase 1 when switching to a target PUCCH cell or transmitting PUCCH on a slot/sub-slot of a PUCCH cell, but not limited to. In one embodiment, a configured PUCCH cell (timing) pattern without a validity counter may be considered as valid all the time until receiving a NW command (e.g., via DCI, MAC CE, or RRC message) to release/suspend it.

In one embodiment, an initial status of a PUCCH cell (timing) pattern may always be activated. The PUCCH cell (timing) pattern may be deactivated/activated by NW command (e.g., via DCI, MAC CE, or RRC message). Preferably, the initial status may transmit PUCCH on PUCCH of SpCell of this cell group.

In one embodiment, an initial status of a PUCCH cell (timing) pattern may always be deactivated. The PUCCH cell (timing) pattern may be deactivated/activated by NW command (e.g., via DCI, MAC CE, or RRC message).

In one embodiment, an initial status of a PUCCH cell (timing) pattern may be configurable. The PUCCH cell (timing) pattern may be deactivated/activated by NW command (i.e., e.g., DCI, MAC CE, or RRC message).

In one embodiment, a PUCCH cell pattern may be invalid or be suspend/released if a related PUCCH cell (e.g., an initial PUCCH cell or a target PUCCH cell) is deactivated, or the setting of a related PUCCH cell (e.g., an initial PUCCH cell or a target PUCCH cell) is changed (e.g., the SCS is reconfigured). In one embodiment, a PUCCH cell (timing) pattern may be valid or be resumed if a related PUCCH cell (e.g., an initial PUCCH cell or a target PUCCH cell) is (re)activated.

In one embodiment, at least one PUCCH cell pattern may be configured, and a slot/sub-slot level bitmap may be used to indicate the target PUCCH cell.

In one embodiment, a specific configuration may be used to configure one or more PUCCH cell patterns (e.g., PUCCH-CellPattern).

In one embodiment, the first cell and the second cell are associated with one PUCCH cell group.

In one embodiment, each of multiple PUCCH cell patterns corresponds to one of multiple PUCCH cell groups.

In one embodiment, a set of PUCCH cell patterns (e.g., referring to a PUCCH cell pattern list) may be used to configure the PUCCH cell (timing) pattern for each PUCCH cell group. For example, a first list may refer to a first PUCCH cell (timing) pattern for a first PUCCH cell group and second list may refer to a second PUCCH cell (timing) pattern for a second PUCCH cell group.

In one embodiment, a set of PUCCH cell patterns (e.g., referring to a PUCCH cell pattern list) may be used to configure a first pattern for PUCCH of SpCell and a second pattern for PUCCH SCell. For example, a first list may refer to a first PUCCH cell (timing) pattern for PUCCH of SpCell and a second list may refer to a second PUCCH cell (timing) pattern for PUCCH SCell.

In one embodiment, at least one table may be used to indicate at least one PUCCH cell (timing) pattern. For example, the one or more tables may be predefined.

In some embodiments, the number of patterns may depend on the number of maximum slots.

In some embodiments, the number of patterns may depend on the number of configured serving cells.

In some embodiments, a maximum number of patterns may be configured, and the specific index may not exceed the maximum number of configured patterns.

In some embodiments, the specific index may be used to change the PUCCH cell pattern dynamically or semi-statically.

In some embodiments, the one or more PUCCH cell (timing) patterns may be configured in PDSCH-ServingCellConfig, for instance, the PUCCH cell pattern with the specific index may be specified in PDSCH-ServingCellConfig.

In some embodiments, the one or more PUCCH cell (timing) patterns may be configured in ServingCellConfig, for instance, the PUCCH cell pattern with the specific index may be specified in ServingCellConfig.

In some embodiments, the PUCCH cell (timing) pattern may be indicated by a field in a DCI format. In one example, the field may refer to the corresponding pattern index. In one example, the field may refer to the first pattern or the second pattern. In one example, the field may refer to the first list or the second list.

In some embodiments, at least one PUCCH cell (timing) pattern may be configured as a list, for instance, pucch-CellToAddModList. On the other hand, the candidate PUCCH cell (timing) pattern may be changed by including the at least one pattern in a list, for instance, pucch-Cell-ToReleaseList.

In one embodiment, cell indexes include a value of '0' for the first cell and a value of '1' for the second cell.

In some embodiments, the PUCCH cell pattern may be indicated by a MAC CE.

In one example, the MAC CE may include the associated PDSCH serving cell index or/and the corresponding pattern index. In one example, the MAC CE may include the associated PDSCH serving cell index or/and bitmaps corresponding to the status of each PUCCH cell (timing) pattern. Preferably, the applied pattern (i.e., the cell index) may refer to a first value (e.g., '1' or '0') whereas the other patterns may refer to a second value (e.g., '0' or '1'). The first value of the applied pattern may be used to indicate PUCCH carrier switching, and the second value may be used to indicate no PUCCH carrier switching.

In some embodiments, the PUCCH cell (timing) pattern may be indicated in a MAC CE, a DCI, and/or a RRC message.

In some embodiments, the one or more PUCCH cell patterns may be configured in a specific configuration. For example, PUCCH-CellConfig or PUCCH-CellPatternConfig.

In some embodiments, once there is no pattern being configured in PUCCH-CellConfig or PUCCH-CellPattern- Config, the UE may apply at least one PUCCH cell pattern configured by gNB via system information.

In some embodiments, each PUCCH cell (timing) pattern may be configured per uplink serving cell/downlink serving cell/uplink BWP/downlink BWP.

In some embodiments, each PUCCH cell (timing) pattern may refer to one pattern type. In one example, a pattern type may correspond to a specific index. In one example, a pattern type may correspond to a PUCCH cell group. In one example, a pattern type may correspond to a specific group. In one example, a pattern type may correspond to a slot pattern.

In some embodiments, each PUCCH cell (timing) pattern may refer to a configuration, for example, PUCCH-CellPattern, and the configuration may be used to configure one (timing) pattern for PUCCH cell.

In some embodiments, more than one PUCCH cell pattern may be concatenated into a pattern for indicating PUCCH cells for a UE.

In some embodiments, when more than one PUCCH cell (timing) pattern is configured, a first pattern may correspond to primary pattern and a second pattern may correspond to secondary pattern. Preferably, the first pattern may refer to a first PUCCH cell group and the second pattern may refer to a second PUCCH cell group.

In some embodiments, when more than one PUCCH cell (timing) pattern is configured, a first pattern may correspond to primary pattern and a second pattern may correspond to secondary pattern. Preferably, the first pattern may refer to a PUCCH cell group including PCell and the second pattern may refer to another PUCCH cell group not including PCell (e.g., PUCCH SCell, a set of secondary PUCCH cells).

In some embodiments, a set of PUCCH cell patterns may be separated into multiple PUCCH cell groups (e.g., PUCCH cell pattern for primary cell group, PUCCH cell pattern for secondary cell group).

In some embodiments, the pattern table may include a plurality of entries, and each entry may refer to a specific pattern. Preferably, a field in a DCI format may indicate one of the plurality of entries.

In some embodiments, the pattern table may include a plurality of entries, and each entry may refer to the indicated PUCCH cell for a slot. Preferably, the columns of the table may refer to time domain, the rows of the table may refer to the indicated PUCCH cell. Preferably, a field in a DCI format may indicate one of the plurality of entries.

Some exemplary configurations may be illustrated below:

For example, table 1 is a table for indicating PUCCH cell for each slot in each PUCCH cell (timing) pattern. There may be more than one PUCCH cell pattern configured to a UE, and each PUCCH cell (timing) pattern may correspond to a specific index. The first pattern (with index 0) corresponds to a series of bitmaps {00000101000010100000}. If every two bits is regarded as a set of bitmaps, and each bitmap may indicate the corresponding cell for each slot in ascending or descending order. More specifically, the first 2 bits '00' in the bitmaps may indicate CC #0 for the first slot, and the latest 2 bits '00' in the bitmaps may indicate CC #0 for the tenth slot. Alternatively, the latest 2 bits '00' in the bitmaps may indicate CC #0 for the first slot, and the first 2 bits '00' in the bitmap may indicate CC #0 for the tenth slot. It is noted that using two bits is an example of referring the indicated cell but not limited to how many bits should be used in the configuration.

```
PUCCH-Cell-slotConfig :: = SEQUENCE {
    slotIndex ,
    ServingCellIndex,
    ...
}
PUCCH-Cell-Pattern :: = SEQUENCE{
    slotConfigurationToAddModList        SEQUENCE (SIZE (1...mazNrofSlots))OF
PUCCH-Cell-slotConfig
    slotConfigurationToReleaseModList    SEQUENCE (SIZE (1...mazNrofSlots))OF
PUCCH-Cell-slotIndex
}
PUCCH-Cell-slotIndex :: INTEGER (0...maxNrofSlots-1)
PUCCH-Cell-Pattern :: = SEQUENCE {
    nrofCC1slots   INTEGER ( ),
    nrofCC2slots   INTEGER ( ),
    periodicityPattern    ENUMERATED { },
    ...
}
PUCCH-Cell-Pattern:: = SEQUENCE {
    pucchCellPatternId
    bitmaps                    SEQUENCE {
        pucch-CellInslot              BIT STRING (SIZE( )),
        duration        { }
        periodicityPattern { },
    }
    subcarrierSpacing
    ...
}
PUCCH-Cell-PatternList:: = SEQUENCE (SIZE ( ))OF PUCCH-Cell-Pattern
```

TABLE 1

| pattern # | slot # | | | | | | | | | |
|---|---|---|---|---|---|---|---|---|---|---|
| | 1 | 2 | 3 | 4 | 5 | 6 | 7 | 8 | 9 | 10 |
| 0 | 00 | 00 | 01 | 01 | 00 | 00 | 10 | 10 | 00 | 00 |
| 1 | 01 | 01 | 00 | 00 | 01 | 01 | 00 | 00 | 10 | 10 |
| 2 | 10 | 10 | 10 | 10 | 10 | 10 | 01 | 01 | 01 | 01 |
| 3 | 00 | 00 | 00 | 00 | 01 | 01 | 01 | 01 | 10 | 10 | in one embodiment, at least one PUCCH cell (timing) pattern may refer to some information for PUCCH cell indication, for instance, periodicity, duration, PUCCH cell index, sub-carrier spacing of corresponding carrier, reference sub-carrier spacing, bitmaps, pattern index, granularity of (timing) pattern (e.g., sub-slot, slot, millisecond, second, subframe, or/and frame), or/and associated PDSCH serving cell. Preferably, the one or more PUCCH cell patterns may refer to a specific configuration for PUCCH cell. Preferably, the one or more PUCCH cell patterns may be included in a specific configuration for PUCCH cell. Preferably, the PUCCH cell pattern may include one or more specific configurations for PUCCH cell. Preferably, the periodicity may be configured in unit of sub-slot/slot/millisecond/second/subframe/system frame.

In one embodiment, a set of bitmaps may be used to indicate the corresponding PUCCH cell for each slot/sub-slot, and a subset from the set of bitmaps may refer to a PUCCH cell for each slot/sub-slot.

In one embodiment, a set of bitmaps may refer to the transmission status for a PUCCH cell for a slot/sub-slot.

In one embodiment, a set of bitmaps may refer to transmission status for a set of PUCCH cells for a slot/sub-slot. More specifically, transmission status may refer to whether the PUCCH is to be transmitted on the corresponding PUCCH cell.

In one embodiment, a set of patterns may be configured, and each PUCCH cell (timing) pattern may refer to at most two cells. In other words, PUCCH cell may be switched between at most two cells for each PUCCH cell (timing) pattern.

In one embodiment, a set of bitmaps may be used to indicate the corresponding PUCCH cell when the PUCCH cell switches.

In some embodiments, the periodicity may refer to time domain repetition pattern, and the PUCCH cell pattern may or may not repeat itself continuously. In one example, the PUCCH cell pattern (e.g., a periodic cell switching pattern) may repeat itself within a specific period. In one example, the repeated pattern may be changed after a specific time point.

In some embodiments, the periodicity may depend on TDD-UL-DL configuration. Preferably, the periodicity for a specific pattern may refer to the periodicity configured in TDD-UL-DL-pattern.

In one embodiment, a UE may determine a periodicity of the one or more PUCCH cell patterns according to a RRC configuration associated with the one or more PUCCH cell pattern.

In some embodiments, the length of the bitmap is determined based on the number of slots with at least one DL symbol or one flexible symbol configured by TDD-UL-DL-ConfigCommon or TDD-UL-DL-ConfigDedicated within a periodicity configured by dl-UL-TransmissionPeriodicity in TDD-UL-DL-ConfigCommon (i.e., the RRC configuration) configured for Pcell or PUCCH Scell. Each bit or each set of bits that corresponds to a slot in the bitmap is mapped to a slot with at least one DL symbol or one flexible symbol configured by TDD-UL-DL-ConfigCommon or TDD-UL-DL-ConfigDedicated.

In some embodiments, the duration may refer to the number of consecutive slots/sub-slots/frames/sub-frames that a specific pattern repeats. Preferably, repetitions of the PUCCH cell pattern may not exceed the given duration. The PUCCH cell (timing) pattern may not be mapped to the remaining slots in the duration if the completion of the PUCCH cell (timing) pattern cannot be mapped. The PUCCH cell in a slot that no PUCCH cell (timing) pattern is applied may be determined as Pcell or PSCell or may be determined as the PUCCH cell of the last slot in which a PUCCH cell (timing) pattern is applied. Preferably, the PUCCH cell pattern may be reconfigured after the given duration.

In some embodiments, the duration may refer to a specific period in millisecond that a specific pattern lasts. Preferably, the PUCCH cell pattern may stop repeating itself after the given duration. Preferably, the PUCCH cell pattern may be reconfigured after the given duration.

In some embodiments, table 2 is an example of illustrating the bitmaps based on the maximum number of serving cells in PUCCH cell (timing) pattern for a UE. As illustrated in table 2, the length of bitstring used to indicate PUCCH cell may refer to the maximum number of serving cells (e.g., 32). In one example, a subset of bitmaps may refer to log 2(32): 5 bits.

TABLE 2

| Slot # | 1 | 2 | 3 | 4 | 5 | 6 | 7 | 8 | 9 | 10 |
|---|---|---|---|---|---|---|---|---|---|---|
| PUCCH cell | Cell 0 | Cell 0 | Cell 1 | Cell 1 | Cell 0 | Cell 0 | Cell 2 | Cell 2 | Cell 0 | Cell 0 |
| Bitmaps | 00000 | 00000 | 00001 | 00001 | 00000 | 00000 | 00010 | 00010 | 00000 | 00000 |

In some embodiments, table 3 is an example of illustrating the bitmaps based on the number of configured serving cells in PUCCH cell (timing) pattern for a UE. As illustrated in table 3, the length of bitstring used to indicate PUCCH cell may refer to the number of configured serving cells. In one example, a subset of bitmaps may refer to log 2(number of configured serving cells) bits. Specifically, each codeword of the bitmap may correspond to a cell that is configured to the UE in descending/ascending order based on the cell ID. In one example, the number of bits=log 2 (the number of configured cells of a PUCCH cell group). Specifically, each codeword of the bitmap may correspond to a cell of the PUCCH cell group, which is configured to the UE, in descending/ascending order based on the cell ID.

TABLE 3

| Slot # | 1 | 2 | 3 | 4 | 5 | 6 | 7 | 8 | 9 | 10 |
|---|---|---|---|---|---|---|---|---|---|---|
| PUCCH cell | Cell 0 | Cell 0 | Cell 1 | Cell 1 | Cell 0 | Cell 0 | Cell 2 | Cell 2 | Cell 0 | Cell 0 |
| Bitmaps | 00 | 00 | 01 | 01 | 00 | 00 | 10 | 10 | 00 | 00 |

In some embodiments, the length of bitstring used to indicate PUCCH cell may refer to the maximum number of serving cells configured with PUCCH resource.

In some embodiments, transmission status with bit '1' may refer to the activated/applied PUCCH cell (UE may transmit PUCCH on this cell) and bit '0' may refer to the deactivated PUCCH cell (UE may not transmit PUCCH on this cell). Alternatively, transmission status with bit '0' may refer to the activated/applied PUCCH cell and bit '1' may refer to the deactivated PUCCH cell. Preferably, the activated PUCCH cell may refer to the target PUCCH cell. Preferably, the deactivated PUCCH cell may refer to the potential candidate for the PUCCH cell. More specifically, the activated PUCCH cell may refer to the cell where the PUCCH is transmitted and the deactivated PUCCH cell may refer to the candidate cell where the PUCCH is not transmitted.

In some embodiments, at least one list of potential candidates for PUCCH cell may be configured. Preferably, each candidate may refer to a specific index. Preferably, when at least one list is configured, the PUCCH cell (timing) pattern may be determined. Preferably, a list may have corresponding periodicity or/and duration. For example, list #0 may include cell #0, cell #1, and cell #2 and list #1 may include cell #0, cell #2, and cell #3. Preferably, candidates in each list may be the same or different. In one example, when the list #0 is configured, a UE may transmit PUCCH on CC #0 for the first slot and the second slot, and then switching PUCCH cell to CC #1 for the third slot and the fourth slot. An illustrative example may be shown in table 4. Table 4 is an example of illustrating the bitmaps of performing status form for PUCCH cells for a UE. In one example, the bitmaps for (timing) pattern may refer to '11001100110011 0011000000 000000000001100'. Firstly, the first ten bits may refer to the cell with the lowest/highest index in the configured list for ten slots. Secondly, the next ten bits may refer to the cell with higher/lower index than previous one in the configured list for ten slots. Lastly, the final ten bits may refer to the cell with the highest/lowest index for ten slots. Preferably, the number of slots (should be indicated in bitmaps) may be specified by a parameter. In one example, the bitmaps for (timing) pattern may refer to '100 100 010 010 100 001 001 100 100'. More specifically, every three bits may refer to the transmission status mapping to each PUCCH cell in the configured list for each slot.

TABLE 4

| Slot # | 1 | 2 | 3 | 4 | 5 | 6 | 7 | 8 | 9 | 10 |
|---|---|---|---|---|---|---|---|---|---|---|
| Bitmap for CC #0 | 1 | 1 | 0 | 0 | 1 | 1 | 0 | 0 | 1 | 1 |
| Bitmap for CC #1 | 0 | 0 | 1 | 1 | 0 | 0 | 0 | 0 | 0 | 0 |
| Bitmap for CC #2 | 0 | 0 | 0 | 0 | 0 | 0 | 1 | 1 | 0 | 0 |

In some embodiments, more than one cell may correspond to the same PUCCH cell (timing) pattern (e.g., transmission status bitmap). Alternatively, a cell may correspond to a specific PUCCH cell (timing) pattern with transmission status bitmaps. Preferably, each PUCCH cell (timing) pattern may be concatenated together to generate a (timing) pattern for a period. For example, the bitmaps of performing transmission status for the first cell within 5 slots are: {11000}, the bitmaps of performing transmission status for the second cell within 5 slots are: {00110}, and the bitmaps of performing transmission status for the third cell within 5 slots are: {00001}. Then each set of bitmaps may correspond to respective PUCCH cell (timing) pattern (e.g., pattern #0, pattern #1, and pattern #2). When three PUCCH cell (timing) patterns referring to respective bitmaps are concatenated to a specific PUCCH cell (timing) pattern, the specific PUCCH cell (timing) pattern may refer to {11000 00110 00001}. Alternatively, when three PUCCH cell (timing) patterns referring to pattern index are concatenated to a specific PUCCH cell (timing) pattern, the specific PUCCH cell (timing) pattern may refer to {00 01 10} or {pattern 0, pattern 1, pattern 2}. It is noted that the order of patterns in the specific PUCCH cell (timing) pattern may be exchangeable/configurable.

In some embodiments, table 5 is an example of illustrating the bitmaps of indicated PUCCH cell between two cells. As illustrated in table 5, each PUCCH cell (timing) pattern may include bitmaps for the number of slots for a first cell and for a second cell. More specifically, if (or only if) there are two cells as a group, the first cell may refer to bit '0' and the second cell may refer to bit '1'. In other words, bit with value 0 may indicate the PUCCH transmission on the first cell and bit with value 1 may indicate the PUCCH transmission on the second cell. Alternatively, the first cell may refer to bit '1' and the second cell may refer to bit '0'. In other words, bit with value 1 may indicate the PUCCH transmission on the first cell and bit with value 0 may indicate the PUCCH transmission on the second cell. Preferably, the first cell may refer to the cell with the lowest index in the group. Preferably, the first cell may refer to the cell with the highest index in the group. Preferably, PUCCH cells in each group may be the same or different.

TABLE 5

| Slot # | 1 | 2 | 3 | 4 | 5 | 6 | 7 | 8 | 9 | 10 |
|---|---|---|---|---|---|---|---|---|---|---|
| 0 for cell #0/ 1 for cell # 1 | 0 | 0 | 1 | 1 | 0 | 0 | 0 | 0 | 0 | 0 |

In some embodiments, table 6 is an example of illustrating the bitmaps with a gap. As illustrated in table 6, bitmaps may refer to the indicated PUCCH cell for a period. In one example, cell switching may happen every given number of slots. Preferably, the period may be specified by higher layer. Preferably, the period may be indicated by a field in DCI format. Preferably, the period may be indicated by a MAC CE. In one example, the period (gap) between each indicated PUCCH carrier may be the same or may be varied. Preferably, the gap may be specified based on TDD configuration for the PUCCH cell. Preferably, the gap may correspond to the number of slots as DL. Preferably, the gap may correspond to the number of slots as DL and flexible. Preferably, 'n/a' in an exemplary table may refer to indicating the same PUCCH cell as previous one. Preferably, 'n/a' in the bitmaps may not be specified (no specific bit for representing n/a).

TABLE 6

| Slot # | 1 | 2 | 3 | 4 | 5 | 6 | 7 | 8 | 9 | 10 |
|---|---|---|---|---|---|---|---|---|---|---|
| PUCCH cell | Cell 0 | Cell 0 | Cell 1 | Cell 1 | Cell 0 | Cell 0 | Cell 2 | Cell 2 | Cell 0 | Cell 0 |
| Bitmaps | 00 | n/a | 01 | n/a | 00 | n/a | 10 | n/a | 00 | n/a |

In some embodiments, bitmaps may refer to the indicated PUCCH cell in an ascending/descending order in a PUCCH cell group. For example, FIG. 4 is a schematic diagram that illustrates an example of illustrating bitmaps for indicating PUCCH cell in ascending order according to one of the exemplary embodiments of the disclosure. Referring to FIG. 4, if there are four PUCCH cells (e.g., CC #0, CC #3, CC #10, CC #16) configured in a PUCCH cell group, the order of the bitmap to PUCCH cell index mapping from lower to higher cell index may be mapped in ascending/descending order from MSB to LSB of the bitmap. For each bit of the bitmap, value 1 may indicate 'activate', and value 0 may indicate 'deactivate'. Alternatively, value 0 may indicate 'activate', and value 1 may indicate 'deactivate'. Preferably, the indicated cell being activated in the bitmaps may mean that PUCCH is going to be transmitted on the indicated cell. Oppositely, the indicated cell being deactivated in the bitmaps may mean that PUCCH is not expected to be transmitted on the indicated cell.

Handling of PUCCH Cell Pattern Across Cells with Different Numerologies for a Detailed Description:

In one embodiment, PUCCH PCell/reference PUCCH cell may always refer to the cell with the lowest SCS among cells in a PUCCH cell group. In one example, PUCCH PCell (or PUCCH SpCell of this cell group) may refer to the reference cell in a PUCCH cell group.

In one embodiment, the first SCS associated with the first cell is equal to or smaller than the second SCS associated with the second cell.

In one embodiment, if (or only if) the PUCCH carrier moves from lower SCS to higher SCS, one slot in the cell with lower SCS may correspond to more than one slot in the cell with higher SCS. A set of bitmaps referring to one slot in the cell with lower SCS may apply to more than one slot in the cell with higher SCS. For example, FIG. 5 is a schematic diagram that illustrates PUCCH cell (timing) pattern applied to cells with different SCS according to one of the exemplary embodiments of the disclosure. Referring to FIG. 5, the PUCCH cell (timing) pattern applied to a first slot in the initial cell may correspond to a second slot and a third slot in the target cell from the exemplary FIG. 5. More specifically, when (or only when) the set of bitmaps indicates PUCCH transmission on CC #0 to the first slot, PUCCH transmission may not be performed on the slots of CC #1 corresponding to the first slot of CC #0.

Figure 6:
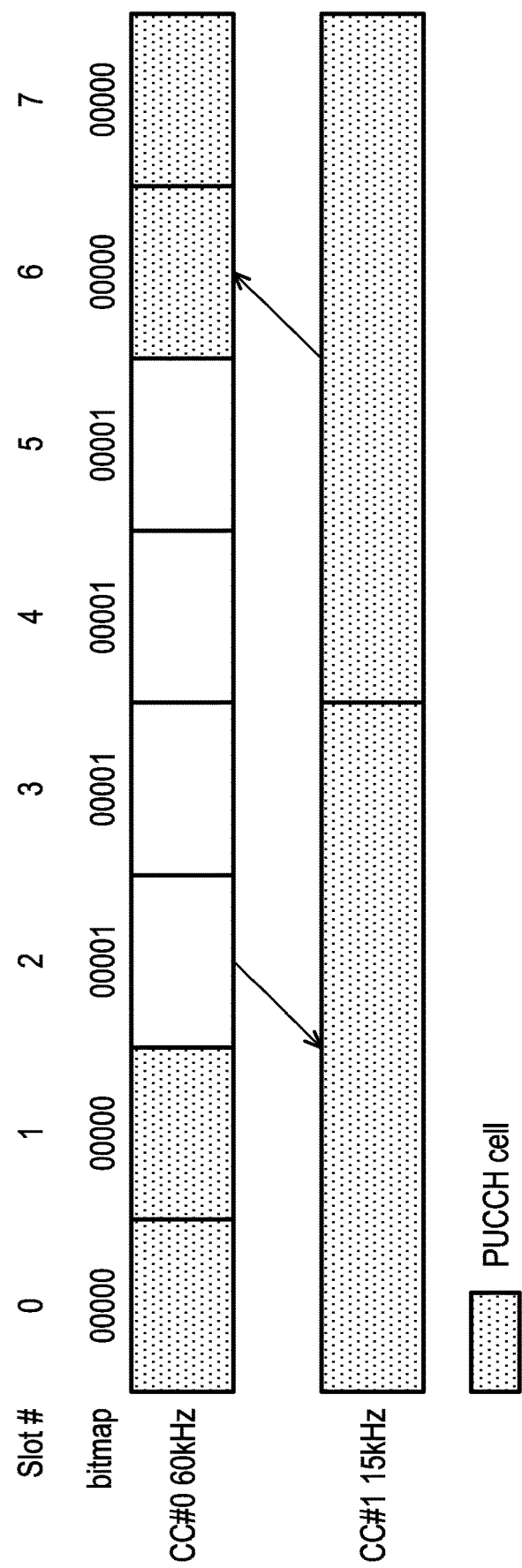
FIG. 6 is a schematic diagram that illustrates applying formulas to cells with different SCS according to one of the exemplary embodiments of the disclosure.

In one embodiment, if (or only if) the PUCCH carrier moves from lower SCS to higher SCS, one slot in the cell with lower SCS may correspond to more than one slots in the cell with higher SCS. A set of bitmaps for each slot may be based on the slot index for each cell. FIG. 6 is a schematic diagram that illustrates applying formulas to cells with different SCS according to one of the exemplary embodiments of the disclosure. Referring to FIG. 6, in one example, if the slot index #2 refers to serving cell index #1 in the initial PUCCH cell, PUCCH cell may be expected to move to the target cell from the slot #2 for the target cell (e.g., CC #1). More specifically, a bitmap of one or multiple bits may correspond to a slot of a UE's initial/target PUCCH cell. A value of the bitmap may indicate a target PUCCH cell that the UE should switch to. The UE may switch to the target PUCCH cell in the beginning/end of the slot with respect to the UE's initial/target PUCCH cell. After switching to the target cell, the target PUCCH cell may then be considered as the UE's initial PUCCH cell. Here, the slot with respect to the UE's initial/target PUCCH cell may refer to a slot configured in the initial/target PUCCH cell. Preferably, the number of bits may depend on the number cells. In one example, the number of bits=log 2(number of configured cells). In one example, if a UE's initial PUCCH cell is CC #1, and a value of a bitmap that corresponds to slot #2 may be used to indicate a target PUCCH cell, CC #2, that the UE should switch to in the beginning/end of slot #2 with respect to CC #1/CC #2.

In one embodiment, some formulas may be used to indicate which PUCCH cell the (timing) pattern is applied to. Preferably, the formula may refer to SCS of the reference/initial/primary cell and the SCS of the target/candidate cell. Preferably, the formula may refer to slot index of reference/initial/primary/target/candidate cell. Preferably, there may be an offset in the formula. In one example, when PUCCH carrier moves from lower SCS $\mu_1$ to higher SCS $\mu_2$, the (timing) pattern applied to slot #x for the reference/initial/primary cell may apply to slots starting from slot #(x·$2^{\mu_2-\mu_1}$) to slot #(x+$2^{\mu_2-\mu_1}$−1) for the target/candidate cell. In one example, when PUCCH carrier moves from higher SCS $\mu_2$ to lower SCS $\mu_1$, the (timing) pattern applied to slots from slot #(x·$2^{\mu_2-\mu_1}$) to slot #((x+1)·$2^{\mu_2-\mu_1}$−1) (x∈0,1,2 . . . ) for the reference/initial/primary cell may apply to slot #x for the target/candidate cell.

In some embodiments, PUCCH cell may move from CC #0 to CC #1 from slot #2 upon CC #0, although slot #0 and slot #1 also correspond to slot #0 upon CC #1, the scheduled/configured PUCCH resource transmitter on CC #1 may ensure that the scheduled/configured PUCCH resource meets the timeline requirement. Preferably, PUCCH may be configured/scheduled no earlier than the slot #1 upon CC #0 when PUCCH cell moves from CC #0 to CC #1. Preferably, PUCCH may be configured/scheduled on the first slot upon CC #1.

Figure 7:
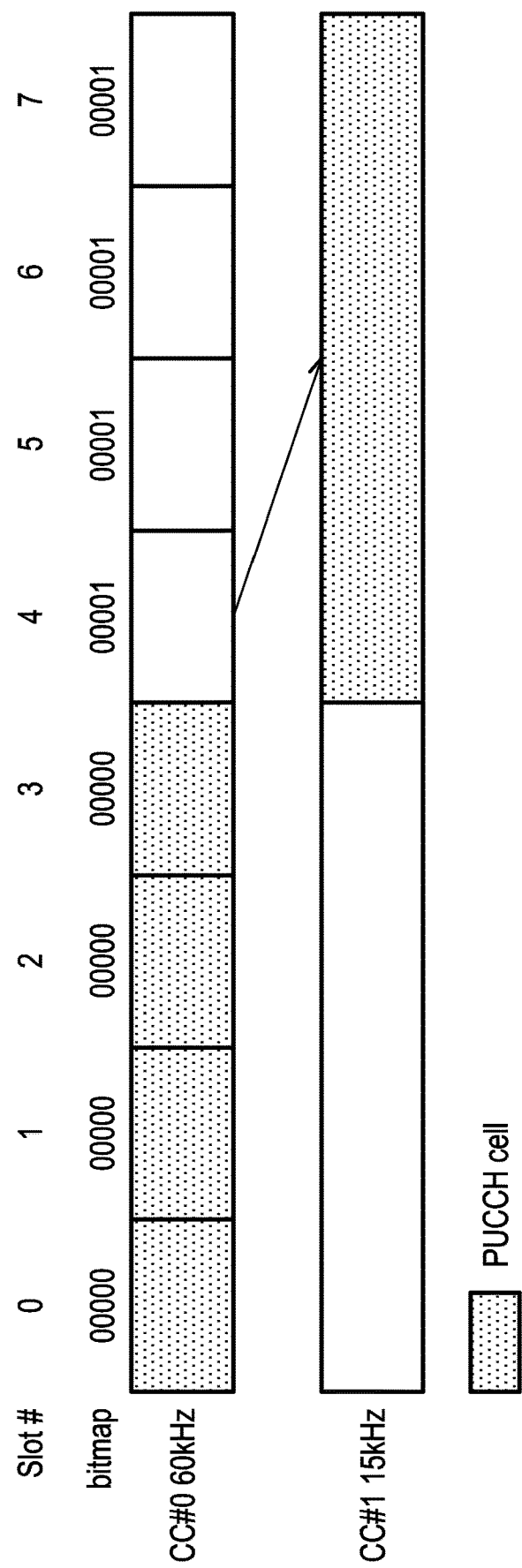
FIG. 7 is a schematic diagram that illustrates applying PUCCH cell (timing) pattern to cells with lower SCS according to one of the exemplary embodiments of the disclosure.

In some examples, FIG. 7 is a schematic diagram that illustrates applying PUCCH cell (timing) pattern to cells with lower SCS according to one of the exemplary embodiments of the disclosure. As illustrated in FIG. 7, if the PUCCH carrier switches from higher SCS to lower SCS, more than one slots in the cell with higher SCS may correspond to one slot in the cell with lower SCS. The corresponding more than one slots may be expected to refer to the same PUCCH carrier (with higher SCS).

In some embodiments, the potential candidates for PUCCH cell may be configured with higher SCS than the reference PUCCH cell/PUCCH PCell in the same PUCCH cell group.

In some embodiments, a plurality of slots may belong to a group for the reference/initial/primary cell. Preferably, the number of slots in a group may be determined by a first SCS $\mu_1$ for reference/initial/primary cell and a second SCS $\mu_2$ for the target/candidate cell. Preferably, the number of slots may be determined by the maximum ($2^{|\mu_1-\mu_2|}$). Preferably, the indicated PUCCH cell in a group may or may not be the same.

In one example, the UE may not expect to be scheduled or configured with PUCCHs in more than one slot on the initial PUCCH cell that carries the same type of UCI, wherein the more than one slots on the initial PUCCH cell correspond to the same slot on the target PUCCH cell. For example, the UE expects to be configured with HARQ-ACK transmission in a PUCCH for SPS PDSCH in at most one slot of slot #4, slot #5, slot #6, and slot #7 on CC #0 in FIG. 7.

In one example, when the UE is scheduled or configured with PUCCHs in more than one slot on the initial PUCCH cell that carries the same type of UCI, where the more than one slot on the initial PUCCH cell corresponds to the same slot on the target PUCCH cell, the UCI associated with different slots on the initial PUCCH cell are concatenated. For example, if the UE is configured with HARQ-ACK transmission in PUCCHs in slot #4 and slot #5 for SPS PDSCH on CC #0 in FIG. 7, UE concatenates the two HARQ-ACK codebooks associated with PUCCHs in slot #4 and slot #5 on CC #0 for transmission on CC #1.

Figure 8:
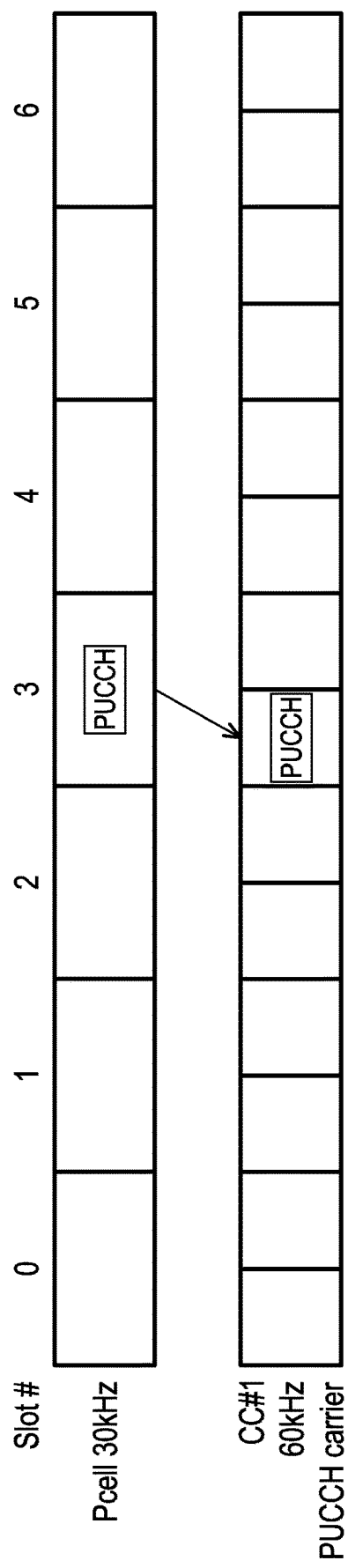
FIG. 8 is a schematic diagram that illustrates an example of illustrating transmitting the PUCCH in an earliest overlapped slot with initial cell upon the target cell according to one of the exemplary embodiments of the disclosure.
Figure 9:
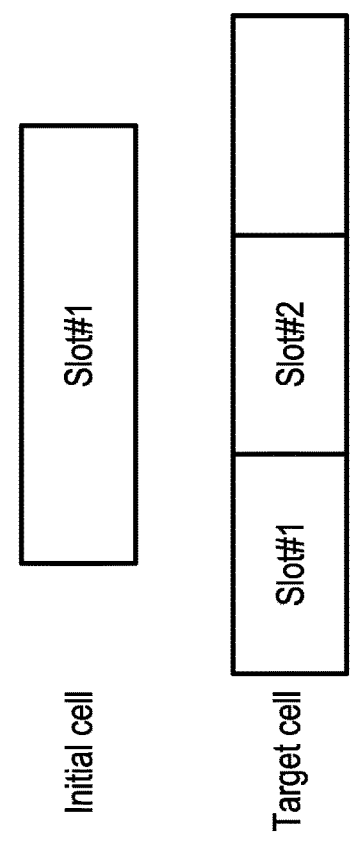
FIG. 9 is a schematic diagram that illustrates an example of illustrating unaligned slot boundary between two cells according to one of the exemplary embodiments of the disclosure.

In one embodiment, if (or only if) the PUCCH carrier moves from a lower SCS initial carrier to a higher SCS target carrier, the UE may not transmit at least one configured/scheduled PUCCH in a first slot upon the initial carrier. The UE may transmit the at least one configured/scheduled PUCCH in the earliest slot upon the target carrier that overlaps with the first slot. FIG. 8 is a schematic diagram that illustrates an example of illustrating transmitting the PUCCH in an earliest overlapped slot with initial cell upon the target cell according to one of the exemplary embodiments of the disclosure. In one embodiment of the present disclosure, overlapping may refer to fully overlapping or partially overlapping as illustrated in FIG. 9 which is a schematic diagram that illustrates an example of illustrating unaligned slot boundary between two cells according to one of the exemplary embodiments of the disclosure.

In one embodiment, if (or only if) the PUCCH carrier moves from carrier 1 with lower SCS (e.g., SCS=15 KHz) to carrier 2 with higher SCS (e.g., SCS=60 KHz), a PUCCH of carrier 2 in a first slot after the last symbol of the PUCCH on the carrier 1 would be applied for corresponding PUCCH transmission.

Figure 10:
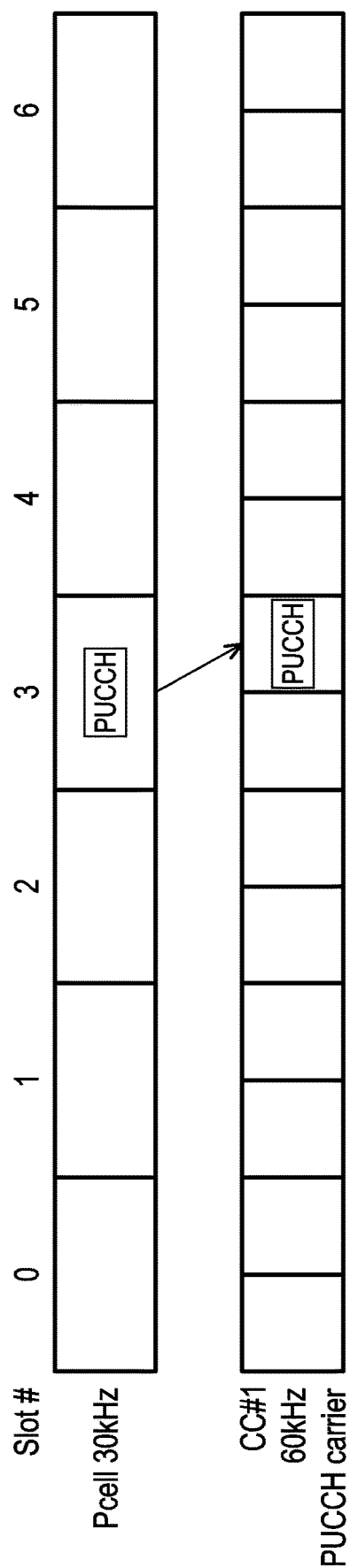
FIG. 10 is a schematic diagram that illustrates an example of transmitting PUCCH in the latest slot upon the target cell that overlaps with the first slot according to one of the exemplary embodiments of the disclosure.

In one embodiment, FIG. 10 is a schematic diagram that illustrates an example of transmitting PUCCH in the latest slot upon the target cell that overlaps with the first slot according to one of the exemplary embodiments of the disclosure. Referring to FIG. 10, if the PUCCH carrier moves from a lower SCS initial carrier to a higher SCS target carrier, the UE may not transmit at least one configured/scheduled PUCCH in a first slot upon the initial carrier. The UE may transmit the at least one configured/scheduled PUCCH in the latest slot upon the target carrier that overlaps with the first slot.

In one embodiment, if (or only if) the PUCCH carrier moves from a lower SCS initial carrier to a higher SCS target carrier, the UE may not transmit at least one configured/scheduled PUCCH in a first slot upon the initial carrier. The UE may transmit the at least one configured/scheduled PUCCH in the slot upon the target carrier that overlaps with the configured/scheduled PUCCH. Furthermore, if more than one slots overlap with the first slot, which the PUCCH would be transmitted on may be further specified (e.g., whether to transmit PUCCH on the earliest or latest overlapping slot may be predefined or may be configured by the network). Preferably, the earliest/latest overlapping slot may be used to transmit the PUCCH. More specifically, the overlapping slot may refer to the slot for the PCell and the slot for cells other than PCell. Preferably, it is up to gNB's implementation to determine which slot the PUCCH would be transmitted on. Preferably, it is up to UE's implementation to determine which slot the PUCCH would be transmitted on.

In one embodiment, if (or only if) the PUCCH carrier moves from a lower SCS initial carrier to a higher SCS target carrier, the UE may not transmit at least one configured/scheduled PUCCH in a first slot upon the initial carrier. The UE may transmit the at least one configured/scheduled PUCCH in the earliest slot upon the target carrier that satisfies the timeline requirement. Preferably, the earliest slot may or may not be earlier than the first slot.

In one embodiment, the network may not indicate a dynamic carrier switching and/or semi-static carrier switching to move the PUCCH carrier of a UE from an initial PUCCH carrier to a target PUCCH carrier for transmitting a configured/scheduled PUCCH if the configured/scheduled PUCCH on the indicated (slot/symbol upon the) target PUCCH carrier does not satisfy the timeline requirement for transmitting the PUCCH.

In one embodiment, the network may not indicate a dynamic carrier switching and/or semi-static carrier switching to move the PUCCH carrier of a UE from an initial PUCCH carrier to a target PUCCH carrier for transmitting a configured/scheduled PUCCH if the (first/last symbol of the) configured/scheduled PUCCH on the indicated (slot/symbol upon the) target PUCCH carrier occurs earlier than the (first/last symbol of the) configured/scheduled PUCCH on the initial PUCCH carrier.

Figure 11:
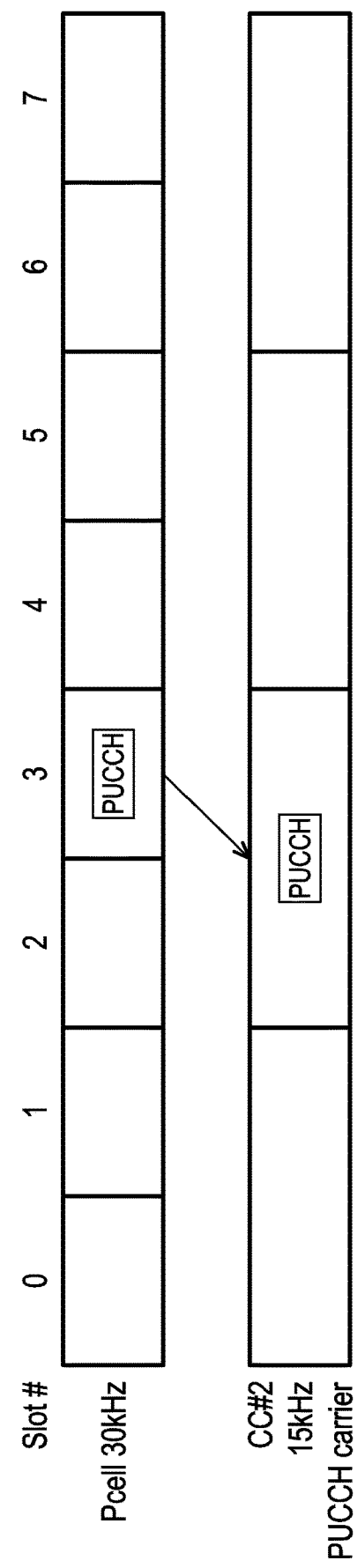
FIG. 11 is a schematic diagram that illustrates an example of transmitting PUCCH in a slot upon the target cell overlapping with the first slot according to one of the exemplary embodiments of the disclosure.

In one embodiment, FIG. 11 is a schematic diagram that illustrates an example of transmitting PUCCH in a slot upon the target cell overlapping with the first slot according to one of the exemplary embodiments of the disclosure. Referring to FIG. 11, if the PUCCH carrier moves from a higher SCS initial carrier to a lower SCS target carrier, the UE may not transmit at least one configured/scheduled PUCCH in a first slot upon the initial carrier. The UE may transmit the at least one configured/scheduled PUCCH in a second slot upon the target carrier that overlaps with the first slot. Preferably, the configured/scheduled PUCCH may be the earliest PUCCH resource (satisfying timeline requirement) in the second slot. Preferably, the configured/scheduled PUCCH may be the latest PUCCH resource (satisfying timeline requirement) in the second slot. Preferably, the configured/scheduled PUCCH in the second slot may not be earlier than the configured/scheduled PUCCH in the first slot.

Figure 12:
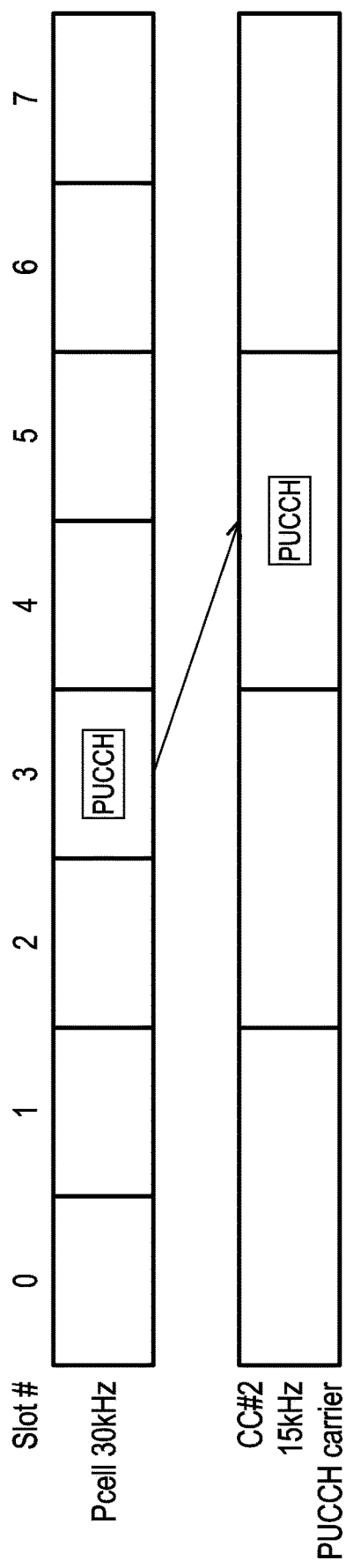
FIG. 12 is a schematic diagram that illustrates an example of transmitting PUCCH in a slot upon the target cell next to the first slot according to one of the exemplary embodiments of the disclosure.

In one embodiment, FIG. 12 is a schematic diagram that illustrates an example of transmitting PUCCH in a slot upon the target cell next to the first slot according to one of the exemplary embodiments of the disclosure. Referring to FIG. 12, if the PUCCH carrier moves from a higher SCS initial carrier to a lower SCS target carrier, the UE may not transmit at least one configured/scheduled PUCCH in a first slot upon the initial carrier. The UE may transmit the at least one configured/scheduled PUCCH in the next slot starting after the slot upon the target carrier that overlaps with the first slot.

Figure 13:
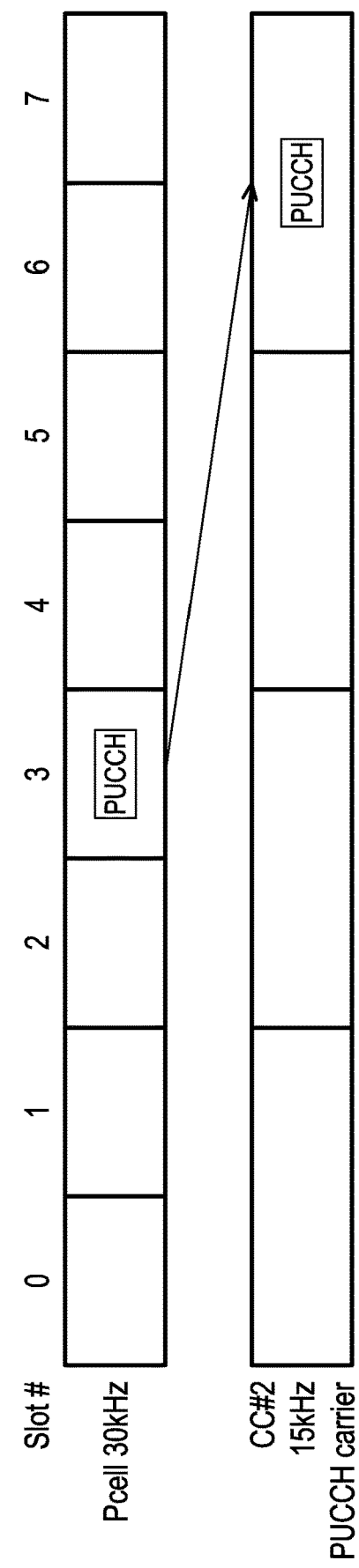
FIG. 13 is a schematic diagram that illustrates an example of transmitting PUCCH in a slot upon the target cell that has the same slot index as the first slot according to one of the exemplary embodiments of the disclosure.

In one embodiment, FIG. 13 is a schematic diagram that illustrates an example of transmitting PUCCH in a slot upon the target cell that has the same slot index as the first slot according to one of the exemplary embodiments of the disclosure. Referring to FIG. 13, if the PUCCH carrier moves from a higher SCS initial carrier to a lower SCS target carrier, the UE may not transmit at least one configured/scheduled PUCCH in a first slot upon the initial carrier. The UE may transmit the at least one configured/scheduled PUCCH in a second slot upon the target carrier that has the same slot index as the first slot.

In some embodiments, the configured/scheduled PUCCH in the target cell may need to meet the timeline requirement.

In some embodiments, the configured/scheduled PUCCH in the target cell may not be earlier than the configured PUCCH in the initial cell.

In some embodiments, the timeline requirement may refer to the PUCCH starts no earlier than at symbol $L_1$, where $L_1$ is defined as the next uplink symbol with its CP starting after $T_{proc,1}=(N_1+d_{1,1}+d_2)(2048+144)\cdot\kappa 2^{-\mu}\cdot T_c+T_{ext}$ after the end of the last symbol of the PDSCH corresponding to the HARQ-ACK information carried in the PUCCH. Preferably, $N_1$ is based on UE capability 1 and UE capability 2. Preferably, $\mu$ corresponds to the one of ($\mu_{PDCCH}$, $\mu_{PDSCH}$, $\mu_{UL,initial}$, $\mu_{UL,target}$) resulting with the largest $T_{proc,1}$, where $\mu_{UL,initial}$ may correspond to the subcarrier spacing of the initial PUCCH cell, and $\mu_{UL,target}$ may correspond to the subcarrier spacing of the target PUCCH cell.

Joint Operation of Dynamic Carrier Switching and Semi-Static Carrier Switching for a Detailed Description:

In one embodiment, dynamic carrier switching (refer to DCI indication) and semi-static carrier switching (refer to PUCCH cell (timing) pattern) may apply to scheduled PUCCH and configured PUCCH, respectively. More specifically, which cell the scheduled PUCCH would be transmitted on may be specified by a field in a DCI format. On the other hand, which cell the configured PUCCH would be transmitted on may be specified by PUCCH cell (timing) pattern.

In one embodiment, the indication from dynamic carrier switching may override the indication from semi-static carrier switching. More specifically, when the indication from a DCI and the indication from the PUCCH cell pattern are referred to different PUCCH cells for a specific slot, the UE may transmit the PUCCH on the cell indicated by the DCI.

In one embodiment, both configured and scheduled PUCCH may be transmitted on the cell configured by (timing) pattern, and DCI may be used to further change the configured PUCCH cell.

In one embodiment, the UE may perform multiplexing and deferral for configured PUCCH before performing carrier switching. Preferably, the UCI in the configured PUCCH may refer to LRR, HARQ-ACK for SPS PDSCH, SR, or CSI report. Preferably, the carrier switching may be indicated through the PUCCH cell (timing) pattern or a DCI indication.

In some embodiments, dynamic carrier switching may be used to indicate different granularity (e.g., slot based, sub-slot based, or millisecond based) based switching from semi-static carrier switching. Preferably, the slot-based switching may be specified by (timing) pattern, and the sub-slot-based switching may be specified by the DCI.

In some embodiments, if (or only if) the received indication from a DCI and the received indication from the PUCCH cell pattern are referred to different PUCCH cell for a specific slot, the configured PUCCH may be dropped.

In some embodiments, if (or only if) the received indication from a DCI and the received indication from the (timing) pattern are referred to different PUCCH cell for a specific slot, the UCI in the configured PUCCH may be multiplexed on other PUCCH/PUSCH transmitted on cell indicated by the DCI. Preferably, the UCI may be multiplexed on UL resource for PUCCH cell which is indicated by the DCI.

In some embodiments, the PUCCH cell configured with more than one PUCCH configuration may be prioritized when more than one PUCCH cell is indicated. Preferably, prioritization may refer to the cell where PUCCH is transmitted.

In some embodiments, the PUCCH cell with high priority UCI (e.g., LRR, SR, HARQ-ACK, or/and CSI report) may be prioritized when more than one PUCCH cell are indicated.

Figure 14:
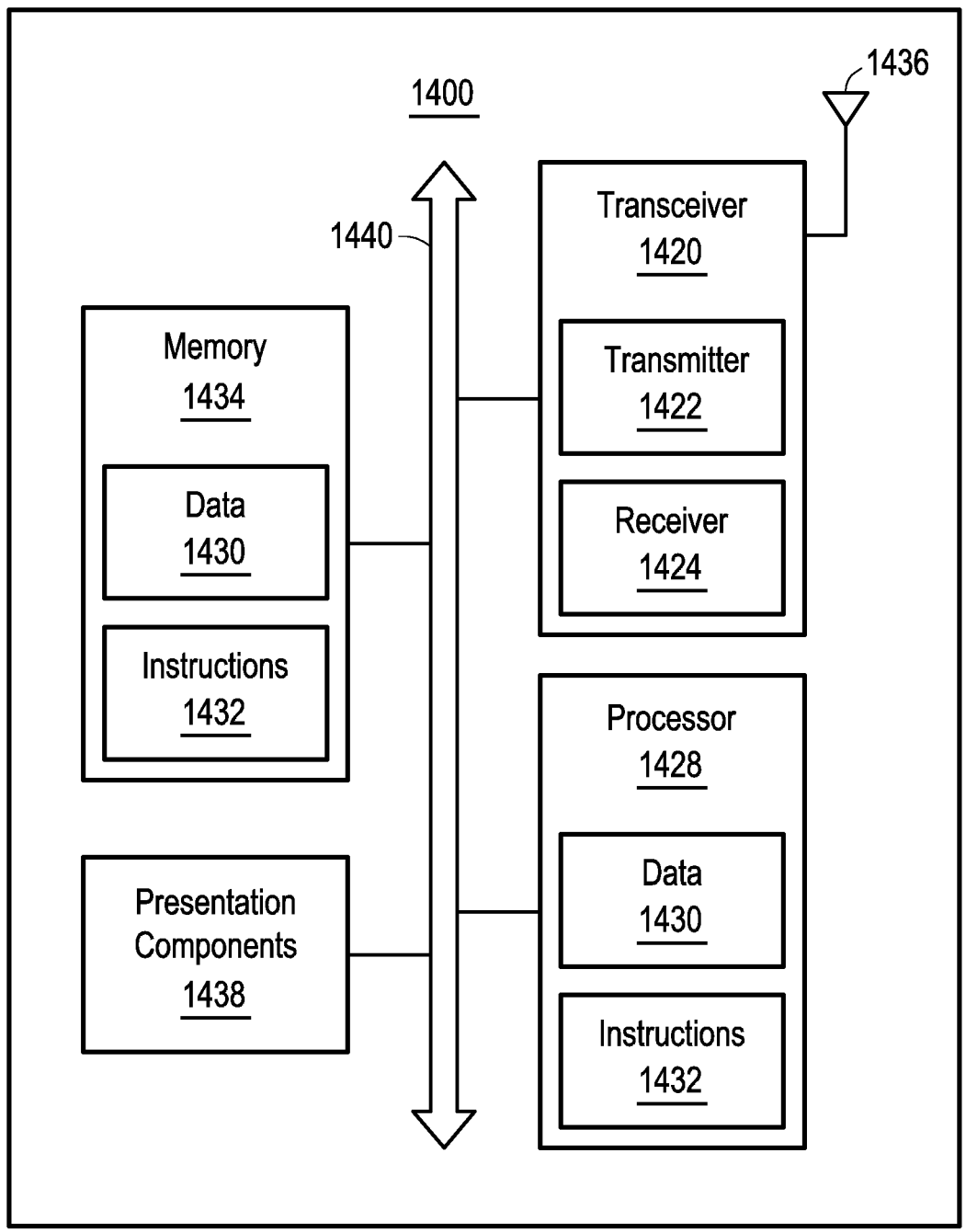
FIG. 14 is a block diagram illustrating a node for wireless communication, according to an example implementation of the present disclosure.

FIG. 14 illustrates a block diagram of a node for wireless communication, in accordance with various aspects of the present application. As shown in FIG. 14, a node 1400 may include a transceiver 1420, a processor 1428, a memory 1434, one or more presentation components 1438, and at least one antenna 1436. The node 1400 may also include an RF spectrum band module, a base station communications module, a network communications module, and a system communications management module, Input/Output (I/O) ports, I/O components, and power supply (not explicitly shown in FIG. 14). Each of these components may be in communication with each other, directly or indirectly, over one or more buses 1440. In one implementation, the node 1400 may be a UE or a base station that performs various functions described herein, for example, with reference to FIGS. 3 through 13.

The transceiver 1420 having a transmitter 1422 (e.g., transmitting/transmission circuitry) and a receiver 1424 (e.g., receiving/reception circuitry) may be configured to transmit and/or receive time and/or frequency resource partitioning information. In some implementations, the transceiver 1420 may be configured to transmit in different types of subframes and slots including, but not limited to, usable, non-usable and flexibly usable subframes and slot formats. The transceiver 1420 may be configured to receive data and control channels.

The node 1400 may include a variety of computer-readable media. Computer-readable media can be any available media that can be accessed by the node 1400 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 1434 may include computer-storage media in the form of volatile and/or non-volatile memory. The memory 1434 may be removable, non-removable, or a combination thereof. Exemplary memory includes solid-state memory, hard drives, optical-disc drives, and etc. As illustrated in FIG. 14, the memory 1434 may store computer-readable, computer-executable instructions 1432 (e.g., software codes) that are configured to, when executed, cause the processor 1428 to perform various functions described herein, for example, with reference to FIGS. 1 through 14-1. Alternatively, the instructions 1432 may not be directly executable by the processor 1428 but be configured to cause the node 1400 (e.g., when compiled and executed) to perform various functions described herein.

The processor 1428 (e.g., having processing circuitry) may include an intelligent hardware device, e.g., a Central Processing Unit (CPU), a microcontroller, an ASIC, and etc. The processor 1428 may include memory. The processor 1428 may process the data 1430 and the instructions 1432 received from the memory 1434, and information through the transceiver 1420, the base band communications module, and/or the network communications module. The processor 1428 may also process information to be sent to the transceiver 1420 for transmission through the antenna 1436, to the network communications module for transmission to a core network.

One or more presentation components 1438 presents data indications to a person or other device. Exemplary presentation components 1438 include a display device, speaker, printing component, vibrating component, and etc.

From the above description, it is manifested that various techniques may be used for implementing the concepts described in the present application without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure

What is claimed is:

1. A method performed by a user equipment (UE) for physical uplink control channel (PUCCH) cell switching, the method comprising:
   receiving a radio resource control (RRC) message from a base station, the RRC message comprising:
       at least one PUCCH cell pattern associated with a plurality of PUCCH cell indexes, wherein each of the plurality of PUCCH cell indexes corresponds to a respective PUCCH cell of a plurality of PUCCH cells, and the at least one PUCCH cell pattern indicates, for each of a plurality of time resource units, which PUCCH cell among the plurality of PUCCH cells is to be used for a PUCCH transmission, and
       a first subcarrier spacing (SCS) associated with a first PUCCH cell of the plurality of PUCCH cells and a second SCS associated with a second PUCCH cell of the plurality of PUCCH cells; and
   performing, based on the at least one PUCCH cell pattern, the PUCCH transmission on one of the first PUCCH cell and the second PUCCH cell.

2. The method of claim 1, wherein the first PUCCH cell is a reference cell, and the first SCS is a reference SCS.

3. The method of claim 1, wherein:
   each of the plurality of time resource units corresponds to a slot,
   the at least one PUCCH cell pattern comprises a bit set, and
   at least one bit of the bit set corresponds to the slot.

4. The method of claim 1, further comprising:
   determining a periodicity of the at least one PUCCH cell pattern based on an RRC configuration associated with the at least one PUCCH cell pattern.

5. The method of claim 1, wherein the first SCS is equal to or smaller than the second SCS.

6. The method of claim 1, wherein the first PUCCH cell is a primary cell (PCell) or a special cell (SPcell).

7. The method of claim 1, wherein performing, based on the at least one PUCCH cell pattern, the PUCCH transmission on one of the first PUCCH cell and the second PUCCH cell comprises:
   in a case that the first SCS is smaller than the second SCS, and a plurality of slots of the second PUCCH cell overlaps with a slot of the first PUCCH cell in time domain, performing the PUCCH transmission on an earliest overlapping slot among the plurality of slots of the second PUCCH cell.

8. The method of claim 1, wherein the plurality of PUCCH cell indexes comprises a value of 0 for the first PUCCH cell and a value of 1 for the second PUCCH cell.

9. The method of claim 1, wherein the first PUCCH cell and the second PUCCH cell are associated with a PUCCH cell group.

10. The method of claim 9, wherein each of the at least one PUCCH cell pattern corresponds to one of a plurality of PUCCH cell groups.

11. A user equipment (UE) comprising:
   a transceiver;
   at least one processor coupled to the transceiver;
   at least one non-transitory computer-readable medium coupled to the at least one processor and storing one or more computer-executable instructions that, when executed by the at least one processor, cause the UE to:
   receive, through the transceiver, a radio resource control (RRC) message from a base station, the RRC message comprising:
       at least one PUCCH cell pattern associated with a plurality of PUCCH cell indexes, wherein each of the plurality of PUCCH cell indexes corresponds to a respective PUCCH cell of a plurality of PUCCH cells, and the at least one PUCCH cell pattern indicates, for each of a plurality of time resource units, which PUCCH cell among the plurality of PUCCH cells is to be used for a PUCCH transmission, and
       a first subcarrier spacing (SCS) associated with a first PUCCH cell of the plurality of PUCCH cells and a second SCS associated with a second PUCCH cell of the plurality of PUCCH cells; and
   perform, based on the at least one PUCCH cell pattern, the PUCCH transmission on one of the first PUCCH cell and the second PUCCH cell.

12. The UE of claim 11, wherein the first PUCCH cell is a reference cell, and the first SCS is a reference SCS.

13. The UE of claim 11, wherein;
each of the plurality of time resource units corresponds to a slot,
the at least one PUCCH cell pattern comprises a bit set, and
at least one bit of the bit set corresponds to the slot.

14. The UE of claim 11, wherein the one or more computer-executable instructions, when executed by the at least one processor, further cause the UE to:
determine a periodicity of the at least one PUCCH cell pattern based on an RRC configuration associated with the at least one PUCCH cell pattern.

15. The UE of claim 11, wherein the first SCS is equal to or smaller than the second SCS.

16. The UE of claim 11, wherein the first PUCCH cell is a primary cell (PCell) or a special cell (SPCell).

17. The UE of claim 11, wherein performing, based on the at least one PUCCH cell pattern, the PUCCH transmission on one of the first PUCCH cell and the second PUCCH cell comprises:
in a case that the first SCS is smaller than the second SCS, and a plurality of slots of the second PUCCH cell overlaps with a slot of the first PUCCH cell in time domain, performing the PUCCH transmission on an earliest overlapping slot among the plurality of slots of the second PUCCH cell.

18. The UE of claim 11, wherein the plurality of PUCCH cell indexes comprises a value of 0 for the first PUCCH cell and a value of 1 for the second PUCCH cell.

19. The UE of claim 11, wherein the first PUCCH cell and the second PUCCH cell are associated with a PUCCH cell group.

20. The UE of claim 19, wherein each of the at least one PUCCH cell pattern corresponds to one of a plurality of PUCCH cell groups.

* * * * *